(12) United States Patent
Chen et al.

(10) Patent No.: US 12,409,639 B2
(45) Date of Patent: Sep. 9, 2025

(54) LAMINATE STRUCTURE AND WEARABLE ARTICLE

(71) Applicant: Graphene Composites Limited, Stockton-on-Tees (GB)

(72) Inventors: Sandy Chen, Balcombe (GB); Stephen Devine, Hebburn (GB)

(73) Assignee: GRAPHENE COMPOSITES LIMITED, Stockton-On-Tees (GB)

( * ) Notice: Subject to any disclaimer, the term of this patent is extended or adjusted under 35 U.S.C. 154(b) by 0 days.

(21) Appl. No.: 16/971,885

(22) PCT Filed: Feb. 22, 2019

(86) PCT No.: PCT/GB2019/050488
§ 371 (c)(1),
(2) Date: Aug. 21, 2020

(87) PCT Pub. No.: WO2019/162684
PCT Pub. Date: Aug. 29, 2019

(65) Prior Publication Data
US 2022/0018634 A1 Jan. 20, 2022

(30) Foreign Application Priority Data

Feb. 22, 2018 (GB) .................................. 1802895
Feb. 22, 2018 (GB) .................................. 1802899

(51) Int. Cl.
*B32B 5/02* (2006.01)
*A41D 13/05* (2006.01)
(Continued)

(52) U.S. Cl.
CPC .......... *B32B 27/08* (2013.01); *A41D 13/0518* (2013.01); *B32B 5/02* (2013.01);
(Continued)

(58) Field of Classification Search
None
See application file for complete search history.

(56) References Cited

U.S. PATENT DOCUMENTS

| | | | |
|---|---|---|---|
| 4,843,947 | A | 7/1989 | Bauer et al. |
| 5,377,577 | A | 1/1995 | Bounkong et al. |

(Continued)

FOREIGN PATENT DOCUMENTS

| | | |
|---|---|---|
| CN | 101839674 A | 9/2010 |
| CN | 102015282 A | 4/2011 |

(Continued)

OTHER PUBLICATIONS

PCT/GB2019/050488; International Search Report; Apr. 10, 2019; 14 pages.

(Continued)

*Primary Examiner* — Samir Shah
(74) *Attorney, Agent, or Firm* — Kilpatrick Townsend & Stockton LLP

(57) ABSTRACT

A laminate structure comprises a protective layer and a backing structure. The backing structure comprises a first support layer comprising an aerogel and a second support layer comprising a polymer and is arranged so that the second support layer is provided between the protective layer and the first support layer.

16 Claims, 8 Drawing Sheets

(51) Int. Cl.
   *B32B 7/09*    (2019.01)
   *B32B 27/08*   (2006.01)
   *B32B 27/12*   (2006.01)
   *B32B 27/28*   (2006.01)
   *B32B 27/32*   (2006.01)
   *B32B 27/40*   (2006.01)
   *F41H 5/04*    (2006.01)

(52) U.S. Cl.
   CPC ............ *B32B 5/024* (2013.01); *B32B 7/09* (2019.01); *B32B 27/12* (2013.01); *B32B 27/281* (2013.01); *B32B 27/32* (2013.01); *B32B 27/40* (2013.01); *F41H 5/0478* (2013.01); *F41H 5/0492* (2013.01); *B32B 2250/05* (2013.01); *B32B 2255/10* (2013.01); *B32B 2255/20* (2013.01); *B32B 2255/26* (2013.01); *B32B 2262/0253* (2013.01); *B32B 2266/126* (2016.11); *B32B 2307/54* (2013.01); *B32B 2307/558* (2013.01); *B32B 2307/581* (2013.01); *B32B 2307/732* (2013.01); *B32B 2571/02* (2013.01)

(56) References Cited

U.S. PATENT DOCUMENTS

| | | | |
|---|---|---|---|
| 2004/0132845 A1* | 7/2004 | Rhine | C08J 9/28 521/82 |
| 2005/0085146 A1 | 4/2005 | Farkas | |
| 2012/0128983 A1 | 5/2012 | Yoon et al. | |
| 2012/0189782 A1 | 7/2012 | Zafiropoulos et al. | |
| 2013/0215551 A1 | 8/2013 | Bowers et al. | |
| 2014/0127490 A1 | 5/2014 | Islam et al. | |
| 2014/0208932 A1 | 7/2014 | Lee | |
| 2014/0240921 A1 | 8/2014 | Sultenfuss et al. | |
| 2014/0260937 A1 | 9/2014 | Whitaker | |
| 2014/0287641 A1* | 9/2014 | Steiner, III | F41H 5/0471 428/317.1 |
| 2015/0065613 A1* | 3/2015 | Balijepalli | C08K 3/36 523/466 |
| 2015/0198380 A1 | 7/2015 | Haj-Hariri et al. | |
| 2015/0218730 A1 | 8/2015 | Dang et al. | |
| 2015/0260329 A1 | 9/2015 | Bond | |
| 2016/0200882 A1 | 7/2016 | Bhat | |
| 2016/0221303 A1* | 8/2016 | Jancar | B32B 7/02 |
| 2016/0265857 A1 | 9/2016 | Benthem | |
| 2016/0276056 A1 | 9/2016 | Stolyarov et al. | |
| 2017/0003104 A1 | 1/2017 | Andresen et al. | |
| 2017/0028674 A1 | 2/2017 | Wadley et al. | |
| 2017/0218141 A1 | 8/2017 | Nosker et al. | |
| 2018/0022061 A1 | 1/2018 | Kotake et al. | |
| 2018/0073841 A1 | 3/2018 | DeKort | |
| 2018/0304598 A1 | 10/2018 | Drzal et al. | |
| 2020/0061970 A1 | 2/2020 | Chen | |
| 2021/0078309 A1 | 3/2021 | Chen | |
| 2022/0081808 A1 | 3/2022 | Craig | |

FOREIGN PATENT DOCUMENTS

| | | |
|---|---|---|
| CN | 105555519 A | 5/2016 |
| CN | 104848748 B | 8/2016 |
| CN | 106626676 A | 5/2017 |
| CN | 107097478 | 8/2017 |
| CN | 107142037 | 9/2017 |
| CN | 206575941 | 10/2017 |
| CN | 107365497 | 11/2017 |
| CN | 107513168 | 12/2017 |
| GB | 2463454 A | 3/2010 |
| GB | 2559979 A | 8/2018 |
| KR | 20130034473 | 4/2013 |
| KR | 20140039493 | 4/2014 |
| WO | 2004018919 | 3/2004 |
| WO | 2006009921 | 1/2006 |
| WO | 2011/024011 A1 | 3/2011 |
| WO | 2012138803 | 10/2012 |
| WO | 2013148843 | 10/2013 |
| WO | 2014011108 | 1/2014 |
| WO | 2015160822 A1 | 10/2015 |
| WO | 2016015467 | 2/2016 |
| WO | 2016167714 | 10/2016 |
| WO | 2017017628 | 2/2017 |
| WO | 2017123522 | 7/2017 |

OTHER PUBLICATIONS

U.S. Appl. No. 16/488,174 , Non-Final Office Action, Mailed on May 2, 2022, 16 pages.
U.S. Appl. No. 16/488,174 , Non-Final Office Action, Mailed on Oct. 25, 2021, 9 pages.
U.S. Appl. No. 16/488,174 , "Restriction Requirement", Jul. 23, 2021, 8 pages.
U.S. Appl. No. 17/056,246 , Non-Final Office Action, Mailed on Dec. 22, 2021, 10 pages.
U.S. Appl. No. 17/056,246 , "Restriction Requirement", Sep. 24, 2021, 5 pages.
Application No. CN201880013754.7 , Office Action, Mailed on Jun. 28, 2022, 17 pages.
Application No. CN201980027031.7 , Office Action, Mailed on Apr. 25, 2022, 7 pages.
Application No. CN201980027668.6 , Office Action, Mailed on Apr. 14, 2022, 16 pages.
GB2010741.3 , "Examination Report", Jun. 18, 2021, 2 pages.
GB2016940.5 , "Examination Report", May 12, 2021, 2 pages.
PCT/GB2021/051508 , "Invitation to Pay Additional Fees and Where Applicable, Protest Fee and Partial International Search Report", Sep. 23, 2021, 15 pages.
U.S. Appl. No. 16/971,832 , Non-Final Office Action, Mailed on Aug. 2, 2023, 15 pages.
U.S. Appl. No. 16/488,174; Office Action dated Sep. 20, 2023.
U.S. Appl. No. 17/056,246 , Non-Final Office Action, Mailed on Sep. 8, 2022, 8 pages.
U.S. Appl. No. 16/488,174 , Final Office Action, Mailed on Jan. 31, 2023, 26 pages.
Application No. CN201980027031.7, Second Office Action, Mailed on Dec. 15, 2022, 3 pages.
Application No. CN201980027668.6, Third Office Action with translation, Mailed on Jun. 6, 2023, 9 pages.

* cited by examiner

LAMINATE STRUCTURE AND WEARABLE ARTICLE

FIELD OF INVENTION

The present invention relates to a laminate structure, in particular a laminate structure for absorbing impact, such as from a projectile, article or collision, and/or for acting as a barrier to prevent penetration by an object, such as a projectile or edged article.

BACKGROUND TO THE INVENTION

Articles such as bullet-proof or stab-proof vests, armour plating (e.g. on vehicles) contain materials and structures designed to protect a wearer or an object surrounded by the articles from an impact (e.g. from a projectile or blunt force) or from penetration (e.g. from a sharp object or bullet). The articles comprise particular materials arranged in particular structures designed to provide these properties. Typical materials used in body armour include carbon-based fibres, such as para aramid fibres, glass laminates, some polymers and/or metals or alloys. In some cases, the materials are provided in the form of composites or laminate structures, which are designed with particular properties in mind. Often, articles designed for penetration resistance (from edged weapons (e.g. bladed articles), for example) also include additional penetration resistant layers, such as a metal plates or chainmail, but these can be heavy, cumbersome and offer low protection against ballistics.

Depending on the specific use of the articles in which the materials are contained, the articles will need to meet a number of secondary objectives, in addition to the primary need to protect against impact and/or penetration. For example, in the case of body armour, the materials used to prevent impact and/or penetration must be sufficient to prevent against common risks, but at the same time be light enough so that the article can be worn without impairing the wearing or without dissuading the wearer from wearing the article. Modification of the material, or use of additional materials in a composite, may allow for additional properties to be realised, such as flexibility or multi-hit protection. However, in many cases, achieving the secondary objectives leads to sacrifice of other properties, in some cases the ability of the article to protect against impact or penetration may even be reduced. Many existing armours also still are excessively heavy and/or are rigid thereby dissuading users from wearing armours.

Increasingly there is demand for effective impact and penetration protection that is not readily visible, for example so that it can be worn covertly. Where this is the case, typically the protection offered by the article is sacrificed. Moreover, drawbacks with existing materials are that the materials used in these articles are often very rigid, which prevents easy movement compromising the covert nature of the article and/or restricting a wearer's movement.

A relatively new issue that is attracting attention is the reduced performance of existing armours after being submerged in water. A number of failures of Kevlar based soft armour following contact with water have been reported.

It is therefore an objective of this invention to provide a material that can provide effective impact and/or penetration protection but which does not suffer from the drawbacks mentioned above.

SUMMARY OF THE INVENTION

According to a first aspect of the invention, there is provided a laminate structure, comprising a protective layer and a backing structure. The backing structure comprises a first support layer comprising an aerogel and a second support layer comprising a polymer. The backing structure is arranged so that the second support layer is provided between the protective layer and the first support layer.

Embodiments therefore provide a multi-layered article or composite comprising an upper or ballistic layer, an aerogel layer and a polymer layer provided between the upper or ballistic layer and the aerogel layer. In other words, embodiments have an aerogel layer which is at least partially covered, directly or indirectly, by a polymeric layer above which a cover layer in the form of the protective layer is provided. The protective layer may be directly or indirectly on the polymeric layer. In some embodiments, there may be multiple aerogel and polymeric layers and/or multiple protective layers.

The invention in this aspect thus provides a laminate structure that can be used to protect a person or object by absorbing an impact (e.g. from a projectile, weapon or collision) and/or preventing penetration through the structure. Embodiments of the laminate structure achieve this by absorbing the impact and providing a protective structure that resists penetration through the particular combination of layers and the use of an aerogel layer, as explained in more detail below. The laminate structure in embodiments can form part of a ballistic resistant article, such as a worn article (e.g. projectile resistant body armour) or as a protective layer on a vehicle or building, or can form part of a penetration resistance article, for example as stab-resistance body armour.

The laminate structure of the first aspect has been found to be particularly effective at providing protection (e.g. impact absorbing/penetration resistance). This is as a result of the combination of layers, which form a composite article, and, in particular, the properties of the laminate structure arise from the use of an aerogel layer, which acts to absorb impacts and prevent penetration while keeping the weight of the laminate structure low, and the use of the aerogel in combination with the polymer layer.

Aerogels are a class of highly porous (typically nanoporous) solid materials with a very low density and which are very strong relative to their weight, making them useful in preventing penetration and/or absorbing impact in a lightweight protective structure. As explained in more detail below, aerogels are formed by creating a gel and subsequently drying the gel to remove the liquid component (e.g. using supercritical drying). This creates the unique structure which contributes to the advantageous properties.

Moreover, in combination with a polymer layer, the aerogel layer becomes more effective in preventing damage caused by an impact or penetration. The polymer layer provides a number of functions which lead to an overall improvement in the damage resistance properties of the structure, including helping to maintaining the structure of aerogel during an impact event (e.g. preventing or reducing the risk of cracking and holding any fragments of aerogel together). For example, the polymer layer can hold the aerogel layer together as it is deformed and collapsed under the force of the impact. This allows the aerogel layer to continue to resist a force against it or resist subsequent forces (e.g. a multi-hit impact event) and retain its high tensile properties to a greater degree. As a result of its location, the polymer layer advantageously holds together the forward face of the aerogel layer (i.e. the face directed towards the impact), which is subject to the greatest force and is at risk of disintegration or separation. The polymer layer itself may also provide some impact resistance.

The protective layer is a ballistic or penetration resistant high-tensile layer which is provided forward (i.e. in the direction of incoming impact force) of the polymer and aerogel layers in this aspect. The protective layer absorbs a portion of the impact and assists in preventing penetration through the structure. In some embodiments, the protective layer may prevent penetration through the structure, with the aerogel and polymer layers acting as impact absorbing layers, so as to reduce the force transferred through the structure.

Thus, the combination of the polymer layer, aerogel layer and the protective layer is advantageous, as the protective layer provides a high-tensile layer which serves as a barrier to penetration and at least partly reduces the initial force of the impact before the backing structure can absorb a substantial portion of (or the remainder of) the impact. This reduces the likelihood of failure of aerogel layer under the initial peak force and thereby reduces the likelihood that that the aerogel will fracture. In turn, this allows the aerogel to absorb more of the impact and thereby provide better protection.

As a result of the use of this structure, embodiments provide stab and bullet resistant structures at significantly less weight compared to prior art laminate structures offering comparable protection. The use of particular aerogels, polymers and protective layers also allows for production of flexible structures with excellent levels of protection.

In the first aspect, the laminate is arranged so that the protective layer is an upper layer or, in embodiments, the outermost layer of the structure and is provided on top of the backing structure. In embodiments, the protective layer is therefore arranged as the first layer of the three layers to receive the impact of an article or projectile. The protective layer can absorb some of the initial force of any impact and will provide an initial penetration resistant layer. As the protective layer deforms and/or moves under the force of the impact, the backing structure behind the protective layer begins to absorb a portion of the force of the impact. In particular, the backing structure absorbs the impact by deformation of the aerogel layer, which can be as a result of compression (the aerogel can compress significantly) and/or deflection of the aerogel layer. This leads to dispersion of the impact force over a large area (i.e. in the plane of the aerogel lane). In view of the high porosity of the aerogel layer and the exceptionally high strength of the aerogel layer (particularly the strength-to-weight ratio), the aerogel layer offers significant resistance to an impact and to penetration, while also providing impact or shock absorbing properties such that the impact is lessened and not simply transmitted through the laminate structure. Thus, the aerogel layer offers greater force dispersion over a greater area and thus dissipates the force more effectively. The polymer layer may also provide some impact and penetration resistance, but importantly acts to hold together the aerogel layer. In particular, the polymer layer, which can be provided directly on the aerogel layer or which may be indirectly on the aerogel layer, has the effect of reducing the likelihood that the aerogel layer shatters under the force of the impact and holds the laminate structure together in the event of some breakage. This can also provide protection against multiple hits ('multi-hit protection'). This arrangement is particularly important on the front surface of the aerogel, as this is the part of the aerogel that receives the peak force.

Another advantage of this structure compared to prior art composite structures is the ability for the structure to function even after being submerged in water. Prior art composite structures containing Kevlar, for example, have been found to have reduced performance after coming into contact with water. However, it has been found that the composites according to the present invention retain or improve their performance after having been submerged with water. It is thought that this is as a result of the low water retention by aerogels, which forces water between the layers, and the mechanism by which the composite structures according to the present invention defeat a projectile. It is thought that the water must be spatially positioning between the layers of the structure and must be assisting in the transference of energy across the structure as well as releasing some energy as the water is forced out of the composite structure on impact.

As discussed above, aerogels are a class of highly porous (typically nano-porous) solid materials with a very low density. More particularly, an aerogel is an open-celled structure with a porosity of at least 50% (but preferably with a porosity of at least 95% air (e.g. 95 to 99.99%), optionally at least 99%) produced by forming a gel in solution and subsequently removing the liquid component of the gel using supercritical heating. As a result of the drying conditions, the solid portion of the gel maintains its structure as the liquid component is removed, thereby creating the porous body. The pores of an aerogel will typically have a pore size in the range of 0.1 to 100 nm, typically less than 20 nm. In embodiments, however, the aerogel can have a pore size in the range of 0.1 to 1000 nm, optionally 0.1 to 900 nm; 10 to 900 nm; 20 to 900 nm; 20 to 500 nm; or 20 to 100 nm. In embodiments, the porosity and pore size distributions of the aerogels can be measured using nitrogen absorption at 77K and applying the Brunauer, Emmit and Teller (BET) equation (see "Reporting Physisorption Data for Gas/Solid Systems" in Pure and Applied Chemistry, volume 57, page 603, (1985)). An aerogel can be formed from a number of materials, including silica, organic polymers (including polyimide, polystyrenes, polyurethanes, polyacrylates, epoxies), biologically-occurring polymers (e.g. gelatin, pectin), carbon (including carbon nanotubes), some metal oxides (e.g. iron or tin oxide), and some metals (e.g. copper or gold). In some embodiments, the aerogel is a cross-linked aerogel (e.g. the aerogel is formed from a cross-linked polymer, e.g. a cross-linked polyimide). Such aerogels are advantageously flexible and strong.

In addition to the abovementioned advantages, aerogels offer increased impact absorbing properties compared to prior art structures, which typically rely on tensile strength of the materials only and have narrow cones of force dispersion. In contrast, aerogels offer a much broader cone of force dispersion and thus impact forces can be dispersed much more quickly and widely. This is at least in part due to the ability of these layers to spread impacts out in the plane of the layer, as well as through the height of the layer. In particular, the "nano-auxetic" structure of aerogels can provide them with shock-absorbing properties—the nanometre-sized tree-branch-like atomic structures spread the force of an impact along those branches, thereby rapidly dissipating the force of an impact.

By polymer layer it is meant that the layer comprises a polymer. In some embodiments, there may be a plurality of different polymers and/or the polymer may be a copolymer. The polymer layer acts as a binding layer adapted to hold together the structure of the adjacent aerogel layer (i.e. the aerogel layer in the same backing structure) when the aerogel layer receives an impact, or at least to reduce the amount of fracture occurring in the aerogel layer. The polymer may be a single polymer or may be a polymer blend. The polymer can have a number average molecular weight of at least 1,000 Da; for example, at least 10,000 Da (e.g. 10,000 Da to 100,000 Da). In an embodiment, the second support layer comprises polyurethane, polyethylene (including ultra-high molecular weight polyethylene), polypropylene, polyester, polyamide, polyimide and/or an epoxy resin. In some embodiments, the second support layer comprises polyurethane and/or an epoxy resin. In other words, the second support layer can be a polyurethane layer or formed from an epoxy resin (e.g. a thermosetting network polymer formed from an epoxy resin with a hardener) or, in some embodiments, comprise both an epoxy resin and a polyurethane. Polyurethanes are particularly advantageous as the structure comprises rigid sections (based around the isocyanate groups) and soft flexible regions (around the diol groups), which make it suited to providing impact protection while remaining flexible. Other components can also be present. Use of a cross-linked polymer is particularly advantageous as this encourages dissipation of a force across the entire polymer layer.

The laminate structure comprises a number of layers. Each consecutive layer may be directly or indirectly in contact with the other layers of the laminate structure. For example, the laminate structure may further comprise additional layers provided between the backing structure and the protective layer and/or between the layers of the backing structure. The laminate structure may also comprise additional layers provided on top (e.g. on the upper surface of the protective layer) or bottom (e.g. on the lower surface of the aerogel layer) of the laminate structure. Each layer may fully cover a surface of an adjacent layer or may only partially cover the surface of an adjacent layer. In some embodiments, a layer may extend beyond the edge of an adjacent layer. The layers may also each include further components or additives. For example, in some embodiments the polymer may layer may comprise graphene (e.g. graphene platelets). In the laminate structure, the layers may each have a thin sheet structure—i.e. with two larger opposing faces connected by four smaller edges—and may be arranged so that one of the opposing faces is arranged so as to face the direction of expected impact.

In an embodiment, the laminate structure further comprises at least one additional backing structure comprising a first support layer comprising an aerogel and a second support layer comprising a polymer, such that the laminate structure comprises a plurality of backing structures. This arrangement can provide significant further impact protection as multiple impact absorbing backing structures can be provided to absorb impact and prevent penetration through the structure. This can be advantageous as the presence of multiple discrete backing structures allows for multiple aerogel layers protected by polymer layers, which in turn means that a failure of one layer (e.g. a fracture or breach) will not necessarily result in failure of the structure, since there are other layers to absorb an impact. Each aerogel layer can thus be thinner than in single aerogel embodiments. This also has the advantage that the orientation of the aerogel, while still important, is less important as the laminate structure may be oriented either way around (i.e. with the upper protective layer facing direction of expected impact, or lowest aerogel layer facing direction of expected impact) since there will be a polymer layer in front of an aerogel layer thereby acting to hold together an aerogel. This may make the structures and articles incorporating the structures less susceptible to user error. In some embodiments, the backing structures of the laminate structure may be identical in composition and, in other embodiments, may be of different compositions to provide different properties.

In a further embodiment, the backing structures are arranged so that the first support layers and second support layers in the laminate structure alternate. In other words, the second support layer of a second backing structure will be adjacent (although there may be other intervening layers) the first support layer of the first backing structure and be between the first support layers of each backing structure. In this way, there is a protective polymer layer between the aerogel layers, which can serve to retain and bind the structure of each aerogel layer more effectively.

In an embodiment, the laminate structure further comprises at least one additional protective layer provided between each of the backing structures. The laminate structure will thus have a structure having a number of repeating units, each unit comprising a protective layer/a second support layer/a first support layer. Two repeating units would thus have the structure of a protective layer/a second support layer/a first support layer/a protective layer/a second support layer/a first support layer, subject to any additional intermediate layers. This structure provides an effective impact and penetration resistant article as the advantageous properties of each layer are repeated through the entire article. For example, it may be that the force of the impact against the initial, outermost protective layer is sufficient to penetrate through the protective layer, but the reduction of the force of the projectile/objection caused by the impact absorbing properties of the reminder of the layers means that a protective layer further in the structure is able to prevent penetration. In yet a further embodiment, each additional protective layer is provided on the corresponding second support layer of each of the backing structures.

Moreover, it has been found that the increase in the number of backing structures and/or protective layers can lead to a significant improvement in the protection offered, in a non-linear fashion. For example, it has been found that doubling the number of backing structures and protective layers in the claimed manner can more than double the protection afforded by the structure.

In some further embodiments, the number of backing structures in the laminate structure is at least 3 layers, optionally at least 10 layers or, in some embodiments, at least 25 layers. For example, there may be 10 to 200 layers, 25 to 150 layers, or 50 to 125 layers. The number of protective layers may be the same as the number of backing structures, with the protective layers and backing structures alternating. In some embodiments, the number of protective layers is at least 3 layers, optionally at least 10 layers or, in some embodiments, at least 25 layers. For example, there may be 10 to 100 layers, or 25 to 50 protective layers. It has been found that an increased number of layers can lead to a projectile being stopped earlier in the laminate than in cases where there are fewer layers. This may be as a result of a shear thickening effect.

In an embodiment, the protective layer is a high-tensile layer. By high-tensile it is meant that the protective layer is strong under tension. For example, the layer may have a tensile strength of at least 200 MPa, at least 500 MPa, at least 1000 MPa; for example, 250 MPa to 5000 MPa; 1000 MPa to 5000 MPa. This can be measured, for example, by ASTM D7269 where the protective layer is a fibre-based layer and ASTM D3039 for polymer matrix based materials. In an embodiment, the protective layer comprises a metal, an alloy, a polymer and/or a carbon containing material, preferably a polymer and/or a carbon-containing material. For example, the protective layer may comprise a high-tensile polymer and/or carbon fibre containing material. In a further embodiment, the protective layer comprises a high-tensile material selected from the group consisting of aramid (aromatic polyamide) fibres, aromatic polyamide fibres, boron fibres, ultra-high molecular weight polyethylene (e.g. fibre or sheets), poly(p-phenylene-2,6-benzobisoxazole) (PBO), poly{2,6-diimidazo[4,5-b:4',5'-e]-pyridinylene-1,4(2,5-dihydroxy)phenylene} (PIPD) or combinations thereof. For example, in one embodiment, the protective layer is a UHMWPE textile with a weight of between 100 and 200 gsm, optionally between 140 and 180 gsm. Where fibres are used, the layer can comprise a binder, such as an epoxy resin. In some embodiments, the protective layer is a graphene layer. Graphene is a strong but flexible material and therefore resists penetration while being cable of flexing/deforming with the aerogel layers as these deform.

In an embodiment, the second support layer in each backing structure is disposed on the corresponding first support layer in the backing structure. In other words, the second support layer is directly bonded to the first support layer, although an adhesive may be present.

In an embodiment, the second support layer extends around the first layer so as to surround the aerogel. Thus, the second support layer at least partially encloses or encapsulates the aerogel. In such embodiments, the laminate structure can have greater rigidity, which can be advantageous for embodiments where high-strength laminates are required. Furthermore, the likelihood of fracture or breaking of the aerogel can be further reduced through the additional support and protection offered by the second support layer. This can also protect the aerogel from the environment (e.g. from moisture, solvents etc.). In these embodiments, at least part of the second support layer is provided between the first support layer (i.e. the aerogel) and the cover layer, and the layer continues over at least one of the other sides of the first layer.

In an alternative embodiment, the second support layer is layered onto the first support layer. In such embodiments, the flexibility of the aerogel, and the laminate as a whole, can be maintained, while also providing the benefits of the second support layer.

In an embodiment, the second support layer is a flexible polymeric layer. For example, the second support layer may comprise an elastomer (e.g. an elastomeric polymer) and/or a flexible polymer. This provides flexibility to the second support layer, which in turn may allow for the production of a flexible support. This has also found to provide a particularly effective laminate structure, since it can move under impact and conform to and/or maintain the shape of the aerogel layer.

In an embodiment, the second support layer further comprises graphene. In embodiments where there are a plurality of second support layers (e.g. a plurality of backing structures), each support layer may further comprise graphene. For example, the second support layer(s) can comprise graphene in the form of graphene platelets such that the layers are doped with graphene. In some cases, the graphene may be functionalised to improve compatibility with a solvent in the manufacturing process, for example by functionalising using plasma treatment. For example, in some embodiments graphene may be functionalised using carboxyl groups. In some embodiments, graphene is provided in the second support layer in an amount of between 0.1 wt % and 10 wt %, optionally 1 wt % to 8 wt %, optionally 2 wt % to 5 wt %. In some embodiments, the second support layer comprises polyurethane doped with between 2 wt % and 10 wt % graphene. It has been found that this combination can lead to an increased tensile strength compared to polyurethane alone by in excess of 20%. The graphene platelets can have an average particle size (i.e. a number average particle size) in the lateral dimension (i.e. at the greatest width across the face of the platelet) of at least 1 μm, optionally at least 2 μm, at least 5 μm (e.g. 1 to 10 μm, or 1 to 5 μm). Number average thickness of the platelets can be less than 200 nm, e.g. less than 100 nm, less than 50 nm. These measurements can all be measured by SEM. The platelets can comprise single or multiple layers of graphene.

Graphene is known for its exceptionally high intrinsic strength, arising from its two-dimensional (2D) hexagonal lattice of covalently-bonded carbon atoms. When added to many polymers, graphene can significantly increase the tensile strength of that polymer. One practical weakness of graphene is the difficulties in manufacturing layers of significant size and thickness, especially since that for many implementations numerous (sometimes millions) of layers of graphene may be required to provide a material with useful characteristics. In the embodiments disclosed herein, this is addressed by functionalising graphene and dispersing it in a polymer layer, thereby enabling the production of larger sheets.

In an embodiment, the aerogel is a polyimide aerogel. Polyimide aerogels have been found to be particularly effective in such a laminate structure as they have some flexibility while also having a relatively high-tensile strength compared to other aerogels. Furthermore, polyimide-based aerogels also form less dust than silicon-based aerogels, reducing the likelihood of inhaling any aerogel-derived dust. Polyimide-based aerogels also recover from impacts/compressions better than silicon-based aerogels—a key performance criteria for impact protection and providing improved multi-hit protection.

In an embodiment, the first support layer has a thickness of 50 μm to 500 μm, optionally 125 μm to 250 μm. In embodiments where there are a plurality of first support layers, each first support layer has a thickness of 50 μm to 500 μm, optionally 125 μm to 250 μm.

In an embodiment, the second support layer has a thickness of 1 nm to 100 μm, optionally 100 nm to 50 μm, 1 μm to 50 μm, 5 μm to 50 μm, or 10 μm to 20 μm. In embodiments where there are a plurality of second support elements, each second support layer has a thickness of 1 nm to 100 μm, optionally 100 nm to 50 μm, 1 μm to 50 μm, 5 μm to 50 μm, or 10 μm to 20 μm.

In an embodiment, the protective layer has a thickness of 50 μm to 500 μm, optionally 125 μm to 250 μm. In embodiments where there are a plurality of protective layers, each protective layer has a thickness of 50 μm to 500 μm, optionally 125 μm to 250 μm.

In embodiments, the tensile strength of the protective layer is higher than the tensile strength of the first and second support layers. For example, as measured by one of ASTM D7269 and ASTM D3039. In embodiments, the polymer layer has a higher tensile strength than the aerogel layer. Thus, the aerogel layer is the weakest layer in terms of tensile strength per layer, but from a strength-to-weight ratio perspective (i.e. tensile strength per gram), it is extremely strong; thus, it is able to provide a lightweight, but strong laminate structure. In an embodiment, the polymer layer has a higher modulus of elasticity than the aerogel layer. In other words, the polymer layer is less brittle than the aerogel layer.

In a further embodiment, a fastening element or means is provided to secure the protective layer to the backing structure, the fastening element or means being provided along an edge of the laminate structure. By 'provided along the edge' it is meant that the fastening element or means (e.g.

stitching or staples) are provided adjacent and along the edges of the laminate structure (from a top-down view) and extend through the layers to secure the layers together. The fastening element constrains the edges of the laminate. It has been found that this can dramatically improve the performance of laminate and the same level of ballistic performance can be achieved with fewer layers. In another embodiment, a fastening element or means is provided to secure the layers of the laminate structure together, the fastening element or means being provided along an edge of the laminate structure.

In a further embodiment, the protective layer comprises an interlaced or interweaved arrangement of wound fibres. In other words, the protective layer comprises an arrangement having cables or laces formed of a plurality of wound or spun fibres, the cables of laces being arranged in an interlaced or interweave arrangement. In some embodiments, the wound fibres or cables are arranged in a crocheted or warp-knitted pattern (e.g. a raschel knit). In other embodiments, the protective layer comprises a single fibres arranged in a crocheted or warp pattern. This can provide a layer that is significantly stronger than the standard weaved layers of single fibres and bundles of continuous fibres ("tows"—for example, a carbon fibre tow consists of thousands of continuous, untwisted filaments). Moreover, layers in these embodiments do not necessarily require any form of binder (e.g. a polymeric resin).

In an embodiment, the laminate structure comprises a plurality of protective layers arranged as a stack, and wherein a part of each protective layer is moveable relative to at least one adjacent protective layer and wherein a part of each protective layer is connected to at least one adjacent protective layer so as to restrict relative movement of a part of each of the adjacent protective layers. The aerogel layer of the backing structure is arranged to at least partly absorb a force acting on the stack of protective layers. In other words, the composite has a plurality of protective or ballistic layers (high-tensile layers) arranged one of top of the other to provide a stack. Each of the protective layers has a part that is relatively unconstrained such that a part of it can move relative to at least some of the other protective layers (e.g. a first region—or a first unconstrained region). In particular, relative to at least one adjacent layer, which means any protective layer or layers in the same stack, and optionally those immediately adjacent (i.e. those without any further intermediate layers between the layers in question, for example, those abutting the layer in question). The protective layers also have a part that is constrained relative to at least one of the other protective layers of the stack (in other words, relative to at least one adjacent layer, which means any protective layer or layers in the same stack, and optionally those immediately adjacent (i.e. those without any further intermediate layers between the layers in question, for example, those abutting the layer in question)), in some embodiments all of the layers of the stack. The constrained part is able to move to a lesser degree than the unconstrained part as a result of the connection. Thus, movement of this part or region is reduced compared to the part which remains unconnected (or connected, but not restrained to the same degree) or unrestrained. The parts are separate parts, such that one part of the protective layer can move to a greater degree relative to another layer compared to the other, connected part. Preferably, movement is relative to all protective layers in the stack.

Embodiments of such a composite structure provide a protective structure that has a significantly higher damage resistance that prior art structures, while still remaining flexible and without any significant increase in weight. In particular, the ability of a part of the composite structure to remain moveable relative to another provides the protective structure with flexibility compared to prior art structures, where all of the layers are bonded together across their entire faces. Moreover, the constraint of a part of each layer (and only a part) means that movement of a part of the layer is restricted or reduced (e.g. it has reduced relative movement), which the inventors have discovered can significantly increase the damage resistance of the protective structure. This is also particularly beneficial with the backing structure, which helps to absorb the impact acting on the protective layer. As such, the composite has a dramatically increased resistance to impact and damage, but without significantly increasing the weight of the composite structure. Without wishing to be bound by theory, it is thought that this improved effect is as a result of synergistic mechanisms. As a result of the constrained and unconstrained regions, the stack of protective layers of the composite structure has a particular effect when struck as it reflects or 'echoes' a shockwave back towards the source of an impact. This provides a significant stopping force and counters the continued force from the impact. In particular, as an object strikes the stack of protective layers, a shockwave is formed in the layers and moves outwardly. As a result of the configuration and constraint of the layers, this energy or force is reflected back towards the source of the shockwave (e.g. the projectile) and provides significant resistant against the force of the object impacting the composite. The shock wave is thus disrupted by internal reflections within the composite, which serves to be a significant effect in reducing the force (i.e. force dissipation). These help to defeat the object and this effectiveness of the composite structure is particularly prominent where projectiles are bullets or other fast moving projectiles. These effects are particularly pronounced where the edges (or adjacent the edges) of the protective layers are constrained.

In an embodiment, each ballistic layer is connected to at least one adjacent ballistic layer at or adjacent an edge of each ballistic layer. In other words, the connection retains the layer along a region next to an edge or side or at the edge or side. This is such that movement of an edge of the ballistic layer, or all of the ballistic layers in the stack, can be constrained by a connecting means or component provided along an edge of the composite structure. Thus, by 'provided along the edge' it is meant that connection (e.g. via a fastening element or other connection means) can be provided adjacent and along a part of at least one edge of the composite structure (from a top-down view towards a major face). It has been found that this can dramatically improve the performance of composite and the same level of penetration-resistance (e.g. stab) and/or ballistic performance can be achieved with fewer layers. Embodiments of such a composite structure provide a protective structure that has a significantly higher damage resistance. In particular, it has been found that by constraining an edge or adjacent an edge, there can be a significant increase the damage resistance of the protective structure, even compared to other constraints at other positions on the composite structure. In embodiments, where plural parts of each ballistic layer are each connected to at least one adjacent ballistic layer (this may be different layers) so as to restrict relative movement of each of the plurality of (restrained) parts, these parts may be opposing parts adjacent edges of each layer. This can be advantageous, as it can provide a significant stopping effect, while also allowing flexibility in at least one direction (e.g. bending in a plane extending between the restrained edge portions). In embodiments, an edge may be restrained along substantially all (e.g. at least 90%, preferably at least 95%, or 99%) or all of its length.

In a preferred embodiment where the connection is provided at or adjacent the edge, the part of each ballistic layer that is moveable (or with increased movement) relative to an adjacent (or all the other layers of the protective structure) is a central part or region of each layer. In other words, the part that is moveable is further from the edges than the part that is restrained. This can be used to provide a central target area which can be positioned or arranged to receive an impact or strike. This can thus be the region in which the shockwave is generated and also provide flexibility. The connection can thus create a restrained portion of the layer which borders or even encloses this area of reduced constraint.

In a further embodiment, each ballistic layer is connected to at least one adjacent ballistic layer at or adjacent the edges of the ballistic layer so as to constrain movement of a part of each layer around the perimeter of each layer (i.e. the perimeter or edge of the layer is constrained). This means that each ballistic layer is constrained in the stack about its circumference or perimeter thereby preventing movement around the perimeter. This could be continuously around the perimeter, or semi-continuously around the perimeter (e.g. an interrupted line) around the perimeter. For example, the ballistic layer may be constrained around all of the edges of a major face. In a preferred embodiment the unrestrained part (or part with increased movability) can thus be a central region of each layer surrounded or enclosed by the perimeter. As mentioned above, this can be particularly effective, as it can create a relatively moveable centre portion which allows flexibility across much of the stack/layer, but also while providing a significant degree of protection.

In another embodiment, the plurality of ballistic layers in the protective structure are formed from a single sheet of ballistic material folded to form a plurality of layers, the folds between layers providing the connection between adjacent ballistic layers. Thus, the layers of the stack may be a continuous sheet which is folded back onto itself to form a plurality of parallel layers with an interconnection between each layer. These embodiments are a particularly effective way of providing interconnection between the layers of the stack, which can provide constraint along the entirety of at least one edge, and in many cases multiple edges for many of the layers in the stack. This is also particularly easy to manufacture relative to other constraint methods, as it does not require additional materials. In a preferred embodiment, the plurality of ballistic layers are formed from a single sheet of ballistic material that has been folded to provide at least one of the ballistic layers with folds along at least two edges or at least 30% of the perimeter of the layer, preferably at least 40%, at least 50%, at least 70%. In a preferred embodiment, this is the case for at least half of the ballistic layers.

In a further embodiment, the protective structure further comprises a connecting or fastening component adapted to connect each ballistic layer to at least one adjacent ballistic layer so as to restrict relative movement of a part of the adjacent ballistic layers. This can, for example, be in addition to or alternatively to folding a ballistic sheet. Thus, a fastening element or component (or "fastening means") is provided to secure the first and second layers of the composite structure together. The fastening component may be provided along an edge of the composite structure such that it constrains the edges of the composite. The fastening element may extend through all of the layers in the stack to secure the layers together and may optionally connect the protective structure with the ancillary structure (e.g. by also extending through the layers of the ancillary structure). The fastening element or component may be a mechanical coupling element or member, such as stitching, staples or a clamp. In another embodiment, the fastening element or component may be an adhesive e.g. selectively applied to only a part of each layer. In one embodiment, the fastening component connects all of the plurality of layers within the stack.

In a second aspect of the invention, there is provided a laminate structure, comprising a front structure comprising a first front layer comprising an aerogel and a second front layer comprising a polymer; and a protective backing layer. The front structure is arranged so that the aerogel layer is provided between the protective backing layer and the first support layer.

Embodiments therefore provide a multi-layered article or composite comprising an upper structure having an aerogel layer and a polymer layer, with a lower ballistic or protective backing layer provided behind the upper or front structure. The laminate structure is also arranged with the aerogel layer provided between the lower protective or ballistic backing layer and the polymer layer. In other words, embodiments have an aerogel layer which is at least partially covered, directly or indirectly, by a polymeric layer. The aerogel layer may be directly or indirectly on the protective backing layer. In some embodiments, there may be multiple aerogel and polymeric layers and/or multiple protective backing layers. In this aspect, the laminate is arranged so that the front structure is the uppermost or outermost structure or layer and is provided on top of the protective backing structure. In embodiments, the front structure (and in particular the polymer layer of the front structure) is therefore arranged as the first layer of the three layers to receive the impact of an article or projectile. The polymer layer can be provided directly on the aerogel layer or which may be indirectly on the aerogel layer and is particularly advantageously provided on the front surface of the aerogel, as this is the part of the aerogel that receives the peak force.

Accordingly, in embodiments, the laminate structure of the second aspect differs from the laminate structure of the first aspect in that the protective layer is a backing layer in the second embodiment. In embodiments of both the first and second aspects, a polymer layer is provided on the front surface of the aerogel layer. In embodiments, the laminate structure further comprises at least one additional front structure comprising a first support layer comprising an aerogel and a second support layer comprising a polymer, such that the laminate structure comprises a plurality of backing structures.

As set out above, aerogel layers are particularly effective at absorbing impact given their properties. Moreover, in combination with a polymer layer, the aerogel layer becomes more effective in preventing damage caused by an impact or penetration. The polymer layer provides a number of functions which lead to an overall improvement in the damage resistance properties of the structure, including helping to maintaining the structure of aerogel during an impact event (e.g. preventing or reducing the risk of cracking and holding any fragments of aerogel together). For example, the polymer layer can hold the aerogel layer together as it is deformed and collapsed under the force of the impact. This allows the aerogel layer to continue to resist a force against it or resist subsequent forces (e.g. a multi-hit impact event) and retain its high tensile properties to a greater degree. As a result of its location, the polymer layer advantageously holds together the forward face of the aerogel layer (i.e. the face directed towards the impact), which is subject to the greatest force and is at risk of disintegration or separation. The polymer layer itself may also provide some impact resistance.

In embodiments, the individual properties of each specific layers of the second aspect are independently as set out in above in respect of the first aspect of the invention. For example, the aerogel layer may have the composition, thicknesses and properties set out in respect of the aerogels of the first aspect; the properties and compositions set out above in respect of the protective layer in the first aspect may apply equally to the protective backing layer; and the polymer layer. Similarly, in embodiments, the properties and arrangement of the front structure can be the same as those set out hereinabove in respect of the backing structure of the first aspect.

In a third aspect of the invention, there is provided a wearable article comprising the laminate structure of any of the embodiments disclosed herein. In an embodiment, the article comprises an inner surface and an outer surface and wherein, where the laminate structure is according to the first aspect, the laminate structure is arranged so that a protective layer is the outermost layer of the laminate structure (other layers may be present in addition to the structure) and, where the laminate structure is according to the second aspect, the laminate structure is arranged so that a polymer layer is the outermost layer of the laminate structure (other layers may be present in addition to the structure). In other words, in embodiments, the laminate structure is arranged with a polymer layer in front of an aerogel layer (e.g. relative to the outer direction/direction of expected impact).

In a fourth aspect of the invention, there is provided a use of a laminate structure according to any of the embodiments disclosed herein to absorb the force of an impact and/or prevent penetration through an article. For example, where the laminate structure is according to the first aspect, the laminate structure may be arranged with the outermost/uppermost protective layer facing the direction from which a projectile or object is expected to come from and where the laminate structure is according to the second aspect, the laminate structure may be arranged with the outermost/uppermost polymer layer facing the direction from which a projectile or object is expected to come from.

BRIEF DESCRIPTION OF THE DRAWINGS

An example of the invention will now be described with reference to the accompanying diagrams, in which.

Like components are given like reference numerals. For example, a protective layer may be referred to as "102a", "102b" or "202a".

DETAILED DESCRIPTION

Figure 1:
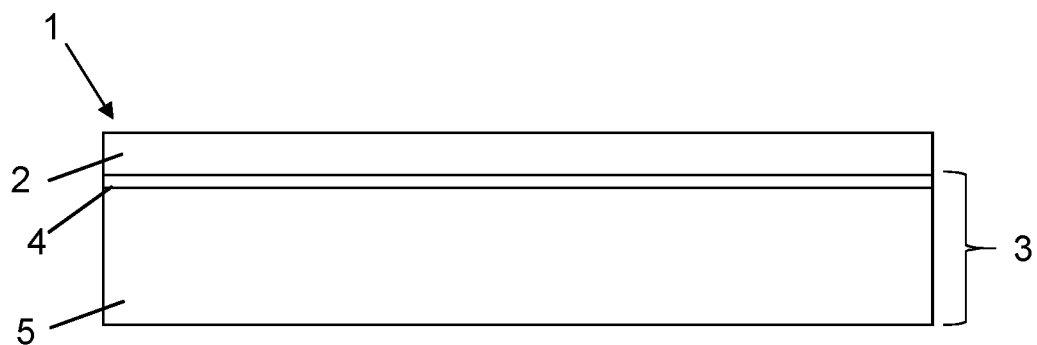
FIG. 1 shows a first embodiment of a laminate structure according to the invention from a side view.

A first embodiment of the invention is shown in FIG. 1 in the form of a laminate structure 1. The laminate structure 1 comprises a protective layer 2 and a backing structure 3, the backing structure 3 comprising a first support layer 5 formed of an aerogel and a second support layer 4 formed of a polymer. The backing structure 3 is arranged so that the second support layer 4 is provided between the protective layer 1 and the first support layer 5. In this embodiment, the layers are arranged so that the aerogel layer 5 is provided at the base of the structure with the polymer layer 4 applied directly to the upper surface of the aerogel layer 5 and with the protective layer 1 applied directly to the upper surface of the polymer layer 4.

In use, the laminate structure 1 can be used in an article, such as body armour, to prevent impact or penetration. The structure 1 is arranged in an article with the protective layer 2 forming the outermost layer (i.e. towards the direction from which the force is expected). In the case of body armour, the laminate structure would be arranged with the protective layer 2 directed away from the body and with the aerogel layer 5 being the layer closest to the body of the wearer. In the case of an impact, such as a projectile impact (e.g. a bullet hitting the body armour), the protective layer 2 is the first layer the projectile comes into contact with.

By way of example, in one embodiment, the protective layer 2 of the laminate structure 1 is an ultra-high molecular weight polyethylene (UHMWPE) layer having a thickness of 180 micrometres. The polymer layer 4 in this embodiment is a 20 micrometre thick layer of polyurethane and the aerogel used in the aerogel layer 5 is a 125 micrometre thick layer of polyimide aerogel. The aerogel layer 5 has voids or bubbles within the structure with an average diameter of 50 nm.

In some embodiments, a laminate structure may comprise a number of repeating elements, such as a plurality of protective layers and/or backing structures. In some cases, these may alternate.

Figure 2:
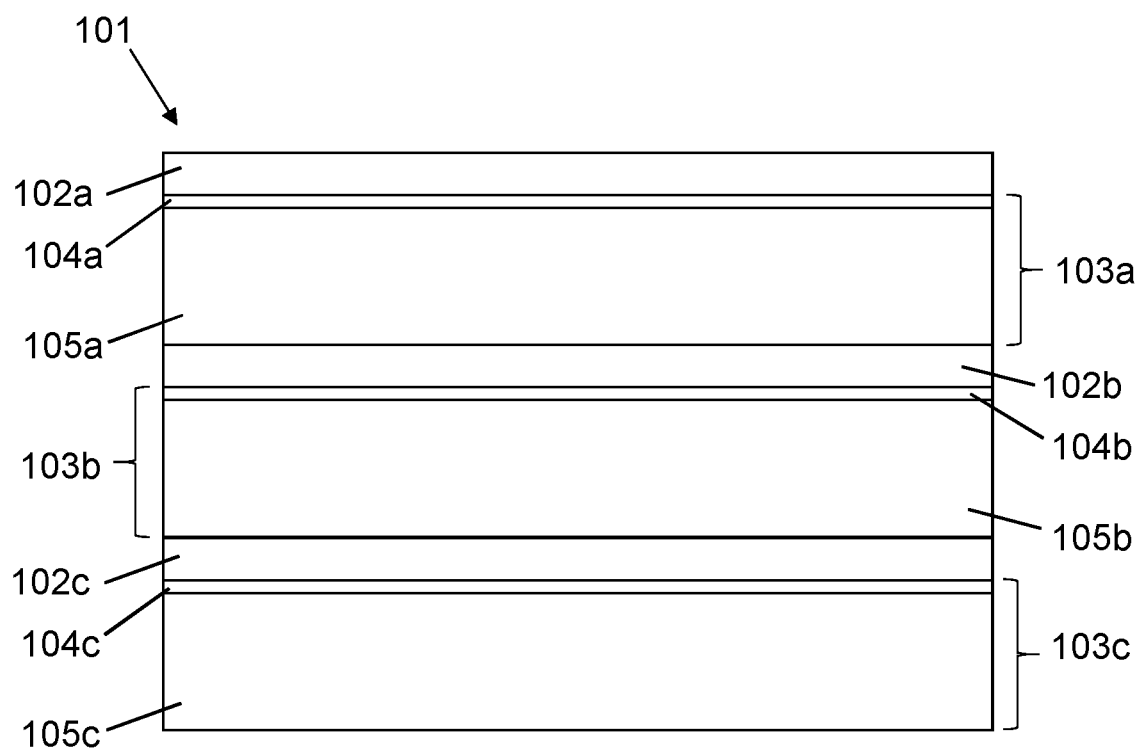
FIG. 2 shows another embodiment of a laminate structure according to the invention from a side view.

For example, in an embodiment shown in FIG. 2, a laminate structure 101 comprises a plurality of protective layers 102a, 102b, 102c and a plurality of backing structures 103a, 103b, 103c. The protective layers 102a-c and the backing structures 103a-c alternative such that the laminate structure has a repeating structure of protective layer/backing structure. In this way, there is an outermost protective layer 102a, behind which is a backing structure 103a comprising a first polymeric layer 104a located between the outermost protective layer 102a and a first aerogel layer 105a. This structure then repeats such that there is a second protective layer 102b behind the first aerogel layer 105a, which is adjacent a second backing structure 103b comprising a second polymeric layer 104b and a second aerogel layer 105b, followed by a third set of layers 102c, 104c and 105c. Although not visible in FIG. 2, the layers 102a-c, 103a-c of the structure 101 are stitched together by means of a high-tensile aramid fibre stitching which extends around the borders of the laminate (from a top-down view).

This repeating structure has been found to be particularly effective at preventing penetration and absorbing impact as the presence of multiple discrete backing structures means that a failure of one aerogel layer (e.g. a fracture or breach) or protective layer will not necessarily result in failure of the structure, since there are other layers to absorb an impact. Further, a further effect has been observed whereby an increase in the number of layers leads to an increase in the effectiveness of the earlier layers in the structure.

As with the laminate structure 1 of FIG. 1, the laminate structure 101 of FIG. 2 can be orientated in an article with the outermost protective layer 102a facing outwardly, towards the direction of expected impact (i.e. the direction from which an impact is most likely to occur). In this way, each of the aerogel layers 105a-c in the structure have an adjacent corresponding polymeric layer 104a-c provided in front of it (i.e. in the direction of impact).

Figure 3:
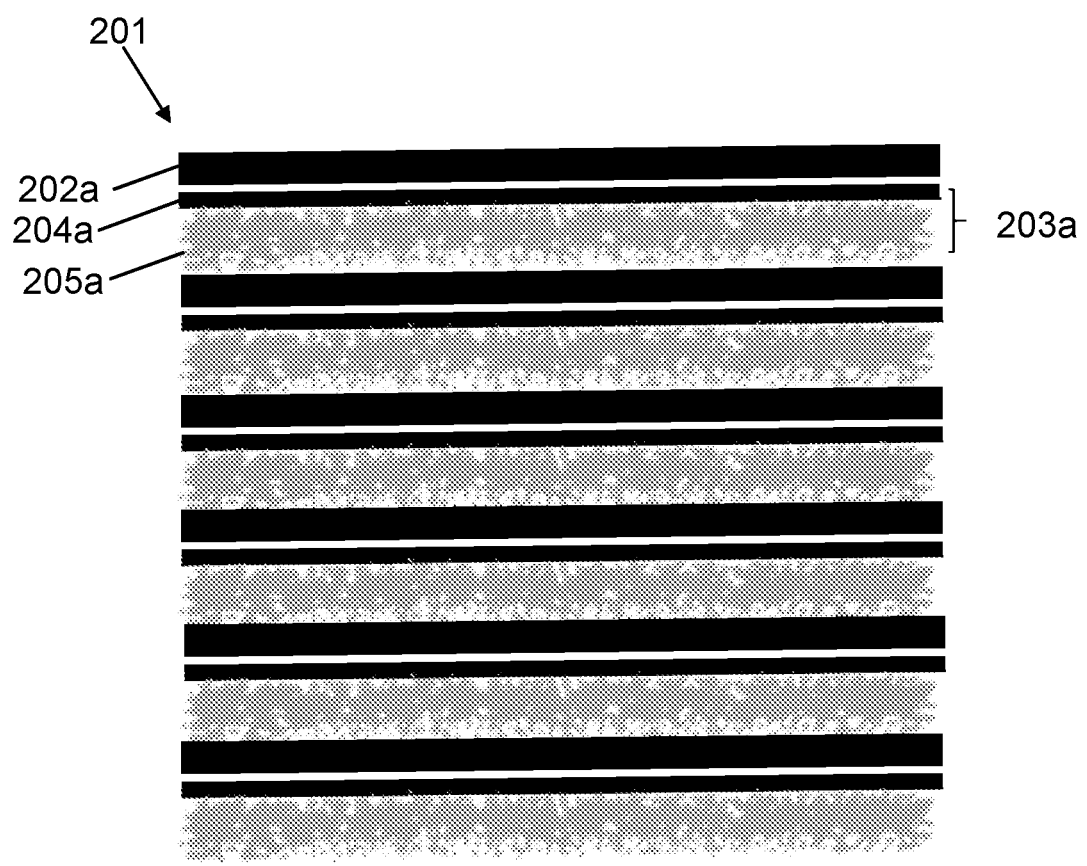
FIG. 3 shows another embodiment of a laminate structure according to the invention from a side view prior to an impact from an object.
Figure 4:
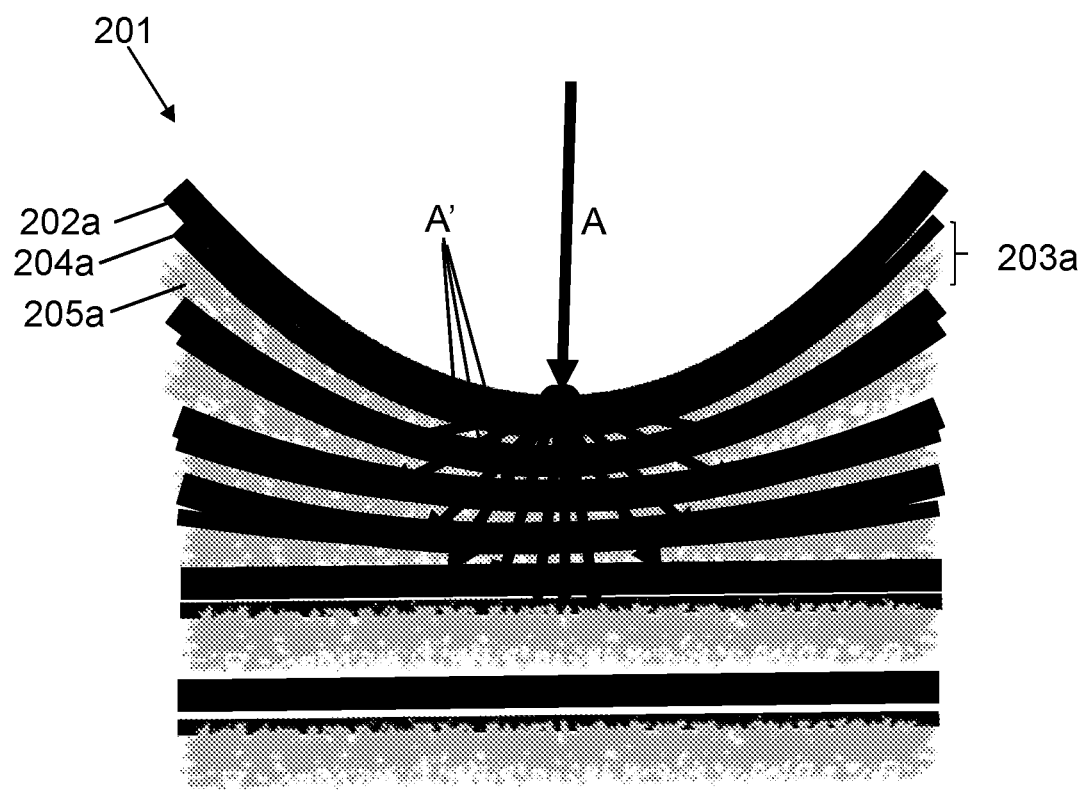
FIG. 4 shows the embodiment of FIG. 3 from a side view after impact from an object.

A specific embodiment of a laminate structure 201 is shown in FIGS. 3 and 4. The laminate structure 201 in this embodiment comprises six sets of layers, each set 210a comprising a protective layer 202a and a backing structure 203a and with each backing structure comprising a polymeric layer 204a and an aerogel layer 205a. In this embodiment, each of the protective layers 202a are high-tensile aramid fibre layers (e.g. Kevlar); the polymeric layers 204a are formed of an epoxy resin and the aerogel layers comprise a polyimide aerogel, with the layers forming a repeating pattern of one protective layer 202a, one polymer layer 204a and one aerogel layer 205a. In this embodiment, no adhesive is provided between the layers 203a, 204a, 205a.

FIG. 3 shows the laminate structure 201 prior to impact by a force, where the layers are in an initial stacked structure. FIG. 4 shows the laminate structure 201 in use, where the top of the structure 201 has been impacted by a projectile in a direction perpendicular to the surface of the layers. As can be seen in this Figure, the force of the impact (designated as arrows A in FIG. 4), causes the deformation of the layers of the laminate structure 201, starting with the uppermost layers 203a, 204a, 205a, and followed by the remaining layers depending on the magnitude of the force A. As the force impacts the upper layers 203a, 204a, 205a, the layers deform and the force begins to be dissipated by these layers (see arrows A'). One of the major mechanisms for this absorption of force is the deformation of the aerogel (which is essentially compressed by the force of the impact). As the force continues, other adjacent layers in the structure will begin to deform thereby further disappoint the force. Eventually, the projectile or source of the force will be stopped thereby preventing penetration and reducing or completely avoiding the transfer of force to the object or person protected by the laminate structure.

In another embodiment (not illustrated), a laminate structure comprises 21 layers comprised of an outermost protective layer of para-aramid synthetic fibre (kevlar), 10 backing structures (i.e. 10 polymer layers and 10 aerogel layers) and 10 additional layers of polyurethane doped with graphene, which polyurethane layers alternate with the backing structures. The additional layers each comprise a 60 μm layer of polyurethane doped with graphene platelets having an average particle size of 2 μm in the largest lateral dimension (ie. Across the largest dimension of the face of the platelet). The graphene platelets were added in a concentration of 1 wt %.

The backing structure comprises an aerogel layer and a polyurethane layer. Total thickness of the composite was 20 mm.

In another embodiment (not illustrated), a laminate structure comprises five protective layers of a polyester fabric comprised of the monomers of Formula 1 below (Diolen 300 gsm Plain Weave) between each pair of layers is provided a backing structure comprises of a polyimide aerogel layer and a polyurethane layer. The polyester fabric is made of a number of fibres, which is then strengthened and held together using an epoxy resin. Total thickness of the composite was 6 mm.

Formula 1

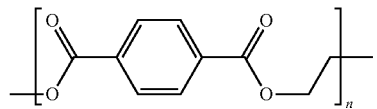

Figure 7:
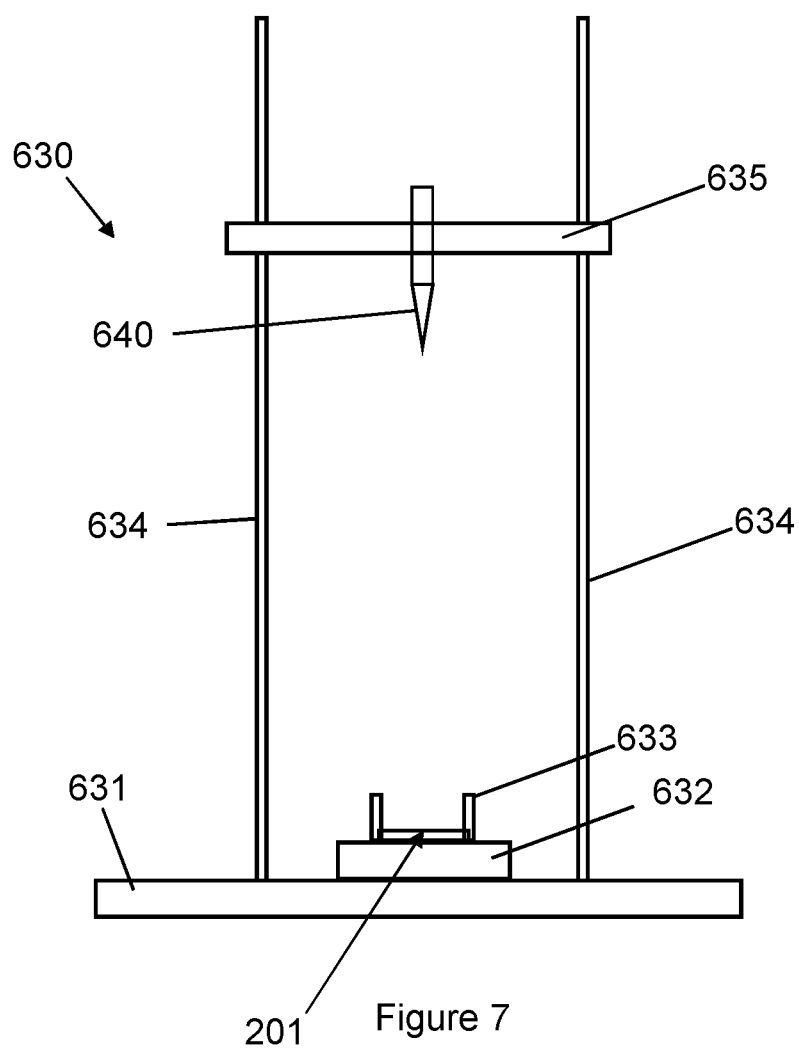
FIG. 7 shows a front view of a test rig.

These two laminate structures were tested for penetration resistance using a test rig 630, which is shown in FIG. 7. The test rig 630 comprises a base 631 on which is provided a jig 632 with clamps 633 for mounting a sample (shown as laminate structure 201 in FIG. 7) thereon. The test rig 630 also comprises a weighted sled 635, to which a knife 640 is attached. The test rig 630 is arranged with the weighted sled 635 and knife 640 suspended above the sample, with the blade of the knife 640 facing the sample (i.e. downwards). The sled 635 and knife 640 can then be dropped and travel along vertical guide rails 634 (using a series of linear bearings (not shown) to minimise friction) until the knife 640 impacts the sample. In the test referred to hereinbelow, the test rig used a Home Office Science Development Branch (HOSDB) P1/B Test blade supplied from High Speed and Carbide Limited. In some of the tests, the jig 632 and clamps 633 were not used to restrain the sample used (referred to as "free standing").

For the first laminate structure (comprising 21 layers and including a Kevlar protective layer), the knife 640 was dropped from a height of 0.75 m and the total weight of the sled 635 and knife 640 in this test was 1.63 kg. The laminate structure prevented complete penetration (penetration of 18 mm was achieved). For the second laminate structure (comprising Diolen), the projectile was dropped from a height of 0.6 m with the same sled 635 and knife 640. The laminate structure prevented complete penetration (penetration of 6 mm into the sample was achieved)

Figure 5:
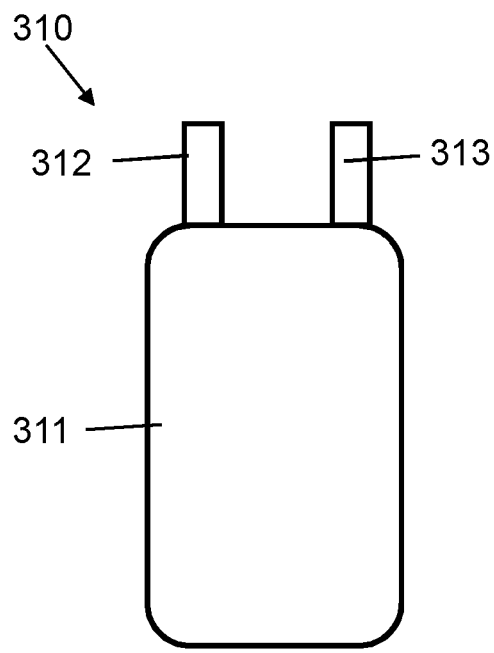
FIG. 5 shows a front view of a wearable article according an embodiment of the invention.

FIG. 5 shows a wearable article according to an embodiment of the invention. In particular, FIG. 5 shows an article in the form of a stab-proof vest 310 having a body section 311 for covering the front of a wearer's torso and two straps 312, 313 which extend from the front face of the body section 311, over the shoulders of a wearer, to a rear face of the body section (not visible). Contained within the vest 310 is a laminate structure 101 according to the embodiment of FIG. 2, with the laminate structure 101 extending as a single sheet the entire way around the body section 311 and with the top protective layer 102a of the sheet 101 facing outwardly (and, therefore, the lowermost backing structure 103c being the layer closest to the users body). In this way, the laminate structure 101 extends around the wearer's body providing protection against impact and penetration. The laminate structure 101 is covered by a fabric outer, which can be any suitable material.

The vest 310 is particularly effective as a covert item worn under clothing, due to the lightweight nature and flexibility of the laminate structure 101. This allows a wearer to move more naturally and without being impeded, while also being effectively protected.

Figure 6A:
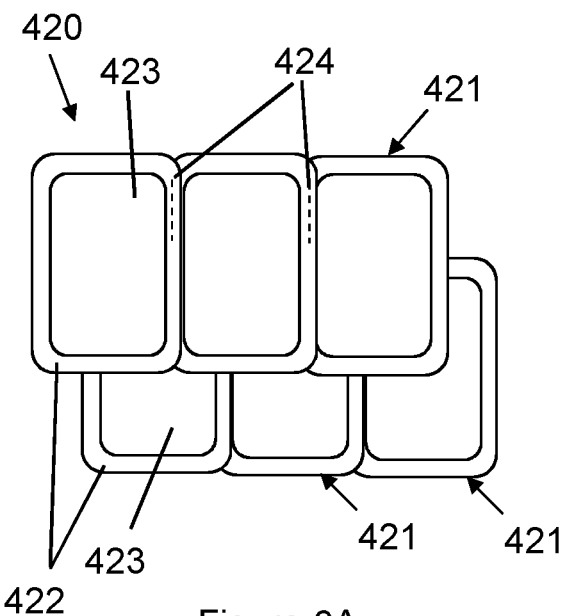
FIG. 6A shows a front view of an arrangement of laminate structures according to an embodiment of the invention.
Figure 6B:
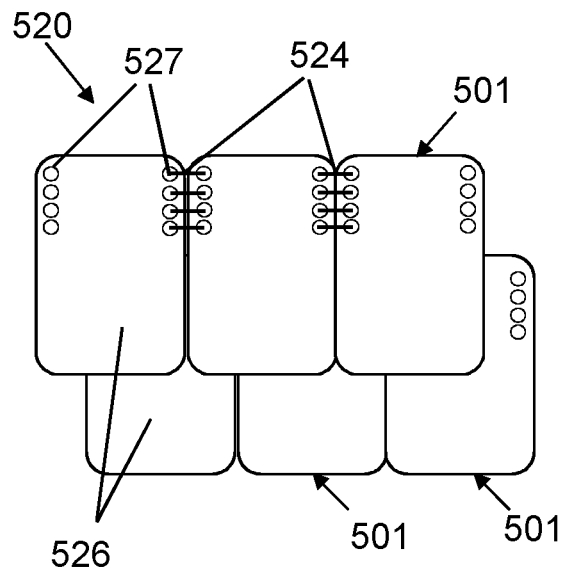
FIG. 6B shows a front view of a further arrangement of laminate structures according to an embodiment of the invention.

Alternative arrangements of a laminate structure arranged for use in wearable articles are shown in FIGS. 6A and 6B. In FIG. 6A, an arrangement 420 is provided in which there are a series of fabric panels 421. Each panel 421 comprises a backing structure of fabric 422 onto which a pocket 423 is provided. Within the pocket 423 of each panel 421 is held a laminate structure, which is arranged with the outermost protective layer facing towards the direction most likely to receive an impact (e.g. outwardly in a wearable article). The pockets 423 are smaller than the total surface area of the backing structure 422, such that an excess border of fabric is provided surrounding the edges of the laminate structure contained within the pocket 423.

A first row of panels 421 is formed with the excess borders of adjacent panels 421 overlapping. In this way, the panels can be held together using a fastening means 424 (for example, stitching) and arranged so as to minimise the surface area not protected by a laminate structure. In this embodiment, the fastening means 424 is provided along an upper portion of the excess border only, to allow for increased flexibility and movement of the laminate structures 421 in each panel relative to one another.

A second row of panels 421 is then provided beneath the first row and offset both in horizontally and vertically (from the front view shown in FIG. 6A). The second row is arranged in a similar manner to the first, with the panels 421 being stitched together. As a result of this offset arrangement, any gaps between laminate structures in adjacent panels 421 in a single row as a result of the excess fabric overlap regions are covered by the offset panels 421 in the second row.

This arrangement 420 can be repeated to provide full coverage of an area requiring protection and can be inserted into a wearable article, for example. This is particularly advantageous as the arrangement 420 of the panels 421 further allows for flexibility of the arrangement/article 420, even where the laminate structure itself is not flexible. Moreover, the arrangement and overlap of the laminate structures in the panels 421 provides effective coverage.

Another embodiment of an arrangement 520 is shown in FIG. 6B. In this embodiment, however, the laminate structures 501 are not contained within any additional housing, but instead each form a panel 501 of the arrangement 520.

In particular, each laminate structure 501 is provided as a rectangular panel 501 with a line of apertures 527 provided along a portion of the two elongate sides of the panels 501. These apertures 527 are used to stitch the panels 501 together with adjacent panels 501 using a fastening means 524 (e.g. stitching). In this embodiment, the fastening means 524 is provided along an upper portion of the edge of each panel 501 only, to allow for increased flexibility and movement of each panel 501 relative to one another.

As with the arrangement in FIG. 6A, the panels are arranged in multiple, overlapping rows. The rows are able to move relative to one another so as to provide increased flexibility and movement.

Figure 8:
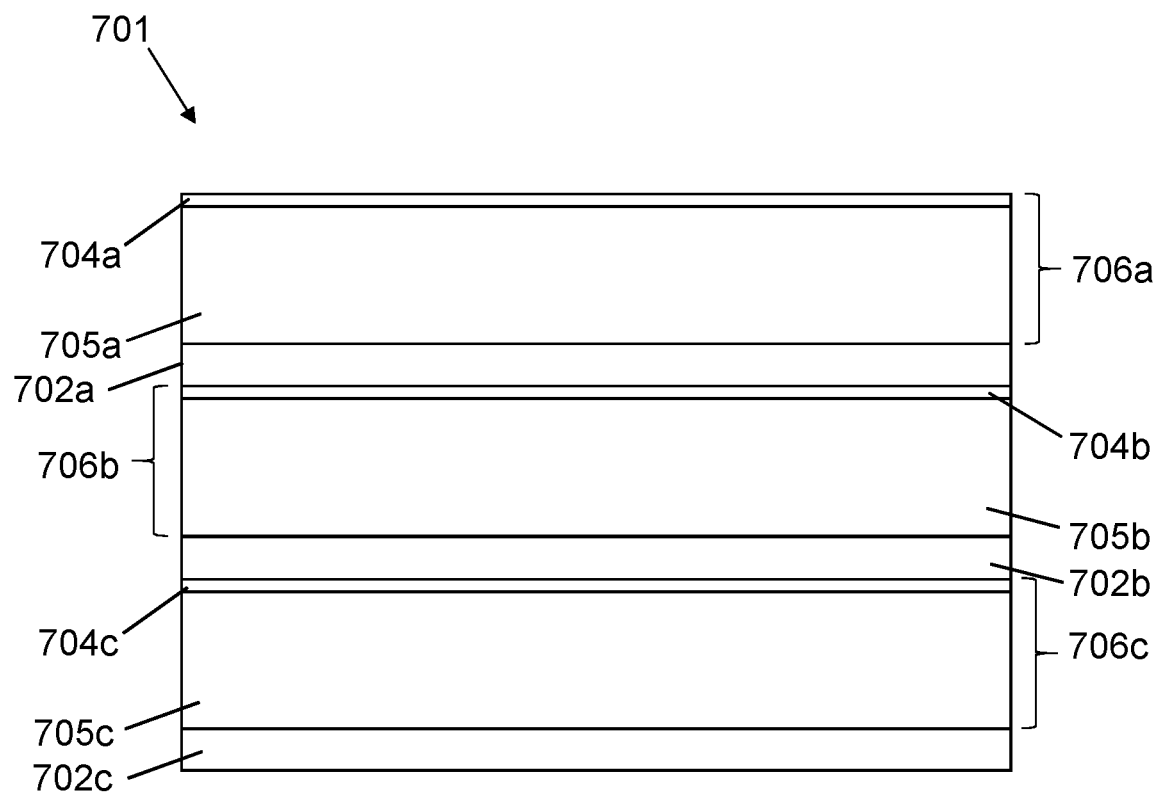
FIG. 8 shows another embodiment of a laminate structure according to the invention from a side view.

In a further embodiment shown in FIG. 8, a laminate structure 701 comprises a plurality of front impact absorbing structures 706a, 706b, 706c and a plurality of protective backing layers 702a, 702b, 702c. The protective backing layers 702a-c and the front structures 706a-c alternative such that the laminate structure has a repeating structure of front structure/backing protective layer. In this way, there is a front structure 706a comprising a first aerogel layer 705a located between the protective backing layer 702a and a first polymeric layer 704a. This structure then repeats such that there is a second polymer layer 704b behind the first protective backing layer 702a.

As with the laminate structures of earlier embodiments, the laminate structure 701 of FIG. 8 can be orientated in an article with the outermost front structure 706a facing outwardly, towards the direction of expected impact (i.e. the direction from which an impact is most likely to occur). In this way, each of the aerogel layers 705a-c in the structure have an adjacent corresponding polymeric layer 704a-c provided in front of it (i.e. in the direction of impact).

Figure 9:
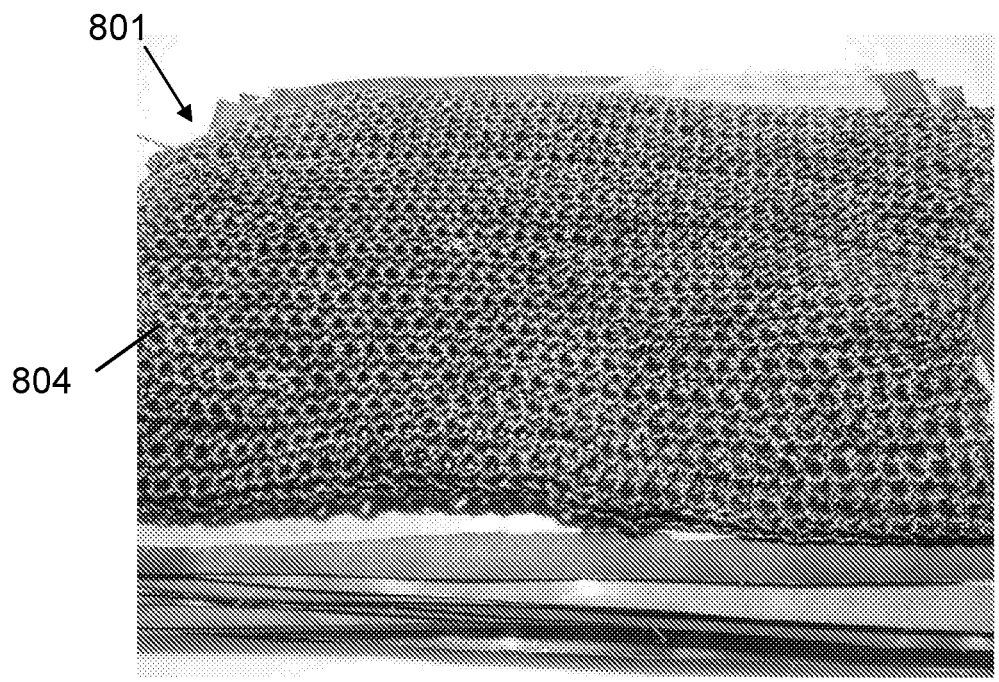
FIG. 9 shows another embodiment of a laminate structure according to the invention from a perspective view.

FIG. 9 shows a laminate structure 801 comprising a number of layers, including a protective layer 804 in the form of an interlaced or interweaved arrangement of wound ultra-high molecular weight polyethylene. In other words, the protective layer comprises an arrangement of UHMWPE thread wound into fibres and then arranged in a crocheted arrangement. This arrangement provides a high-tensile layer that is very resistant to penetration. In essence, the UHMWPE acts in a similar way to chain mail, but with significant advantages in terms of weight and protection offered. In one embodiment, for example, the laminate structure 801 comprises a crocheted arrangement of 1.0 mm UHMWPE braided thread. The photograph provided in FIG. 9 is provided so that the depth of the layer can be seen.

Figure 11:
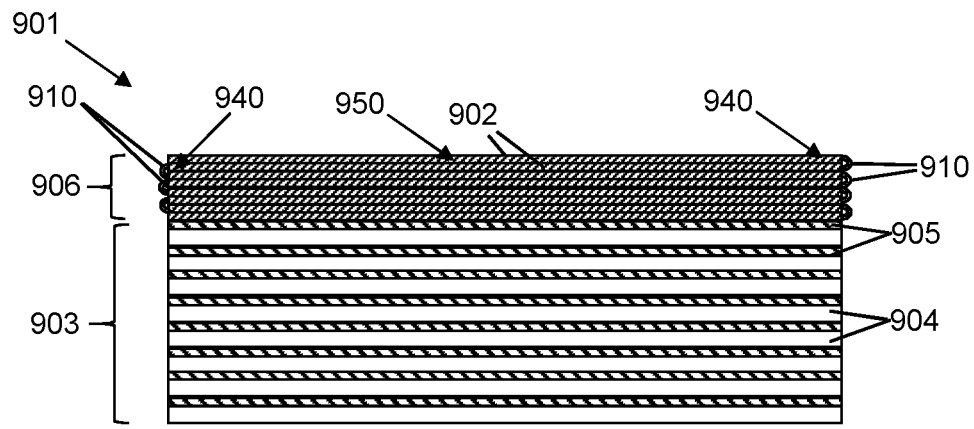
FIG. 11 shows a cross-sectional side view of another embodiment of a composite structure according to the invention.

Another embodiment of the invention is shown in FIG. 11, in which there is a composite structure 901 comprising a front impact absorbing zone (or protective structure) 906 comprising plural protective layers 902 and a lower backing structure 903 provided beneath and abutting the underside of the protective structure of the protective structure 906. The plurality of protective layers 902 are arranged one on top of the other to form a stack. The protective structure 906 also comprises connecting elements 910 which extend along opposing edges of the protective structure 906 to secure a part the protective layers 902 together and to restrict relative movement of the protective layers 902 forming the protective structure, as will be described in more detail, below.

Figure 12:
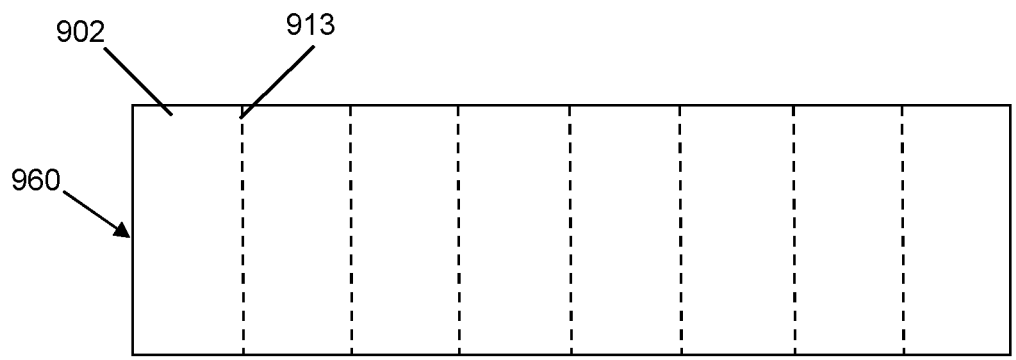
FIG. 12 shows a top view of a sheet of ballistic material.

The connecting elements 910 in this embodiment is not a separate entity but is instead integral to the protective layers 902. In particular, in this embodiment, the protective layers 902 are formed from a single sheet of high-tensile material 960 (see FIG. 12) that is folded on itself to provide the array of parallel protective layers 902 of high-tensile material that are interconnected by folded parts of the material. Thus, it is the folds 913 that form the connecting elements 910. Thus, the connecting elements 910 (i.e. folds) restrict movement of a part of the protective layers 902 during an impact, in particular in the region 940 adjacent the connecting element 910.

Although movement of the protective layers 902 in the region 940 is constrained in the regions surrounding and incorporating the connecting elements 910, no interconnect between the protective layers 902 is provided between the central regions 950 of each protective layer 902 and the protective layers 902 are sufficiently flexible to allow relative movement of the protective layers 902 in this central region 950. This allows movement of these parts of the protective layers 902 during an impact event, such as when the composite structure 901 is struck by a projectile. The structure of the protective layer is therefore one in which the connecting elements 920 define two opposing constrained regions 950 in which movement is restricted and which enclose an unconstrained region 950 in the centre of each protective layer 902.

Methods of manufacturing examples of composite structures will now be described with reference to specific examples. Methods of manufacturing graphene-containing layers (e.g. graphene-containing polyurethane layers) and composite structures which include such layers, together with aerogel layers and high-tensile layers are set out in UK patent application nos. GB1802895.1, GB1802899.3, GB1808119.0 and International patent application nos. PCT/GB2018/050462, PCT/GB2019/050147 and PCT/GB2019/050487, all of which are incorporated herein by reference.

EXAMPLES

Specific examples of laminate structures that provide effective impact and penetration resistance are provided below:

Example 1

A 125 µm flexible polyimide aerogel layer (AeroZero 125 micrometer polyimide aerogel film; BlueShift Inc (US)) was cut to size and coated with a 20 µm layer of a polyurethane (PX30; Xencast UK Flexible Series PU Resin system. Manufacturer reported properties: Hardness of 30-35 (Shore A); Tensile strength 0.7-1.2 MPa; Elongation 100-155% at break; Tear Strength 3.5-3.8 kN/m) using a slot die process. After coating, the polyurethane layer was left to cure at room temperature for 12 hours. The aerogel/polyurethane composite layer (backing structure) was then cut to size.

An ultra-high molecular weight polyethylene (UHMWPE) fabric (Spectra 1000; 200D; Honeywell; 80 gsm; Warp Yarn 24 Tex; Weft Yarn 25 Tex; Encs×Picks/10 cm 177×177; Plain Weave) was cut to the same size as the backing structure and was applied to the upper surface of the backing structure (i.e. the exposed surface of the polyurethane layer).

The laminate structure was then further built up by adding additional, alternating layers of the backing structure (i.e. the combined aerogel/polyurethane layers) and UHMWPE fabric to form a multi-layered composite. In particular, an additional backing structure layer (i.e. the aerogel layer and the polyurethane layer in combination) was then applied to the top of the first UHMWPE fabric layer with the aerogel layer of the additional backing structure layer being applied to the UHMWPE fabric layer. An additional UHMWPE fabric layer was then applied to the top of the second backing structure. This process was repeated to provide a multi-layered composite comprising 60 alternating layers of aerogel/polyurethane and UHMWPE (i.e. 30 backing structures and 30 UHMWPE layers).

This laminate structure was both flexible and lightweight and therefore can be incorporated into body armour. The laminate structure also provided effective protection against damage from a knife impact by absorbing the force of the impact and preventing penetration of the knife through the laminate structure.

Example 2

The laminate structure of Example 2 was prepared in an identical manner to Example 1, with the exception that 5 wt % functionalised graphene (Elicarb graphene powder; Thomas Swan & Co Ltd UK Product No. PR0953) was dispersed in the polyurethane prior to slot die processing. Accordingly, each polyurethane layer in the backing structure comprised 5 wt % graphene.

More specifically: prior to dispersion, the graphene was treated with a plasma treatment of "oxygen" functionalisation using the Hydale HDLPAS process, which is set out in WO 2010/142953 A1 (alternatively, plasma functionalised graphene nanoplatelets are commercially available from Hydale "HDPLAS GNP" e.g. HDPlas GNP-$O_2$ or HDPLAS GNP-COOH) Following treatment, the graphene and polyurethane are premixed in a planetary centrifugal mixer and the resin was degassed under vacuum to remove air bubbles. The mixture was then passed through a dispersion stage using a Three Roll mill (at 40° C. with a <5 µm gap) and with eight passes. The graphene/polyurethane mixture was then mixed with a hardener, followed by subsequent degassing using a planetary centrifugal mixer.

Once the graphene/polyurethane mixture was created it was layered down onto a polypropylene sheet with a 20 µm drawdown wire rod (which regulates the thickness to 20 µm). After the layering down has been completed, the layer was left to dry out. However, before the graphene/polyurethane layer fully cures, the aerogel is stuck onto the layer. The combined layers making up the backing structure were then left to cure for 24 hours, and after which the combined layer of aerogel and the polyurethane/graphene resin mixture was cut into shape.

This laminate structure was both flexible and lightweight and therefore can be incorporated into body armour. The laminate structure also provided effective protection against damage from a knife impact by absorbing the force of the impact and preventing penetration of the knife through the laminate structure.

Example 3

Using the techniques described in respect of Examples 1 and 2, above, a laminate structure comprising 52 layers of UHMWPE fabric (Spectra 1000; 200D; Honeywell; 80 gsm; Warp Yarn 24 Tex; Weft Yarn 25 Tex; Encs×Picks/10 cm 177×177; Plain Weave) alternating with 51 layers of a backing structure was prepared. The backing structure comprised 125 µm flexible polyimide aerogel (AeroZero 125 micrometer film from BlueShift Inc (US)) layered with a 20 µm layer of a polyurethane (PX60; Xencast UK Flexible Series PU Resin system. Manufacturer reported: Hardness of 60-65 (Shore A); Tensile strength 3.4-3.8 MPa; Elongation 200-260% at break; Tear Strength 19.0-23.0 kN/m) (i.e. 51 layers of aerogel alternating with 51 layers of polyurethane). Thus, the laminate had the following repeating pattern arrangement of layers " . . . UHMWPE layer/polyurethane layer/aerogel layer/UHMWPE layer/polyurethane layer/aerogel layer . . . ".

Example 4

Using the techniques described in respect of Examples 1 and 2, above, a laminate structure comprising a stack of 52 layers of UHMWPE fabric (Spectra 1000; 200D; Honeywell; 80 gsm; Warp Yarn 24 Tex; Weft Yarn 25 Tex; Encs×Picks/10 cm 177×177; Plain Weave) and a stack of 51 backing structures was prepared. The laminate structure thus comprised 52 layers of UHMWPE fabric followed by 51 backing structures. Each backing structure comprised 125 µm flexible polyimide aerogel (AeroZero 125 micrometer film from BlueShift Inc (US)) layered with a 20 µm layer of a polyurethane (PX60; Xencast UK). Thus, the laminate had the following pattern arrangement of layers "UHMWPE layer/UHMWPE layer . . . UHMWPE layer/UHMWPE layer/polyurethane layer/aerogel layer/polyurethane layer/aerogel layer . . . polyurethane layer/aerogel layer". Example 4 therefore differs from Example 3 by virtue of the order of the protective layer and the backing structures.

Example 5

Using the techniques described in respect of Examples 1 and 2, above, a laminate structure comprising 26 layers of UHMWPE fibre (DOYENTRONTEX Bulletproof unidirectional sheet; WB-674; 160 g/m$^2$; 0.21 mm thickness) alternating with 25 layers of backing structure was prepared. The backing structure comprised 125 μm flexible polyimide aerogel (AeroZero 125 micrometer film from BlueShift Inc (US)) layered with a 20 μm layer of a polyurethane (PX60; Xencast UK) (i.e. 25 layers of aerogel alternating with 25 layers of polyurethane). In this Example, the polyurethane was infused with 0.2% graphene (Elicarb graphene powder; Thomas Swan & Co Ltd UK Product No. PR0953) using the technique set out in respect of Example 2. Thus, the laminate had the following repeating pattern arrangement of layers " . . . UHMWPE layer/polyurethane+graphene layer/aerogel layer/UHMWPE layer/polyurethane+graphene layer/aerogel layer . . . ".

Example 6

Using the techniques described in respect of Examples 1 and 2, above, a laminate structure comprising 26 layers of UHMWPE fabric (Spectra 1000; 200D; Honeywell; 80 gsm; Warp Yarn 24 Tex; Weft Yarn 25 Tex; Encs×Picks/10 cm 177×177; Plain Weave) alternating with 25 layers of a backing structure was prepared. The backing structure comprised 125 μm flexible polyimide aerogel (AeroZero 125 micrometer film from BlueShift Inc (US)) layered with a 20 μm layer of a polyurethane (PX60; Xencast UK) (i.e. 25 layers of aerogel alternating with 25 layers of polyurethane). Thus, the laminate had the following repeating pattern arrangement of layers " . . . UHMWPE layer/polyurethane layer/aerogel layer/UHMWPE layer/polyurethane layer/aerogel layer . . . ".

Example 7

Example 7 is the same as Example 6, with the exception that the polyurethane layer of each backing structure is doped with 1% graphene (Elicarb graphene powder; Thomas Swan & Co Ltd UK Product No. PR0953) using the technique set out in respect of Example 2. Thus, the laminate had the following repeating pattern arrangement of layers " . . . UHMWPE layer/polyurethane+graphene layer/aerogel layer/UHMWPE layer/polyurethane+graphene layer/aerogel layer . . . ".

Example 8

Using the techniques described in respect of Examples 1 and 2, above, a laminate structure comprising 51 layers of a front structure on top of 52 layers of a protective backing layer (UHMWPE fabric (Spectra 1000; 200D; Honeywell; 80 gsm; Warp Yarn 24 Tex; Weft Yarn 25 Tex; Encs×Picks/ 10 cm 177×177; Plain Weave)) was prepared. The front structure comprised 125 μm flexible polyimide aerogel (AeroZero 125 micrometer film from BlueShift Inc (US)) layered with a 20 μm layer of a polyurethane (PX60; Xencast UK) (i.e. 25 layers of aerogel alternating with 25 layers of polyurethane). Thus, the laminate had the following arrangement of layers "polyurethane layer/aerogel layer/ polyurethane layer/aerogel layer . . . polyurethane layer/ aerogel layer/UHMWPE layer/UHMWPE layer . . . UHMWPE layer/UHMWPE layer".

Example 9

Using the techniques described in respect of Examples 1 and 2, above, a laminate structure comprising five UHMWPE layers (UHMWPE fabric (Spectra 1000; 200D; Honeywell; 80 gsm; Warp Yarn 24 Tex; Weft Yarn 25 Tex; Encs×Picks/10 cm 177×177; Plain Weave)) alternating with five backing layers (five layers of 1% graphene platelet doped polyurethane layers, prepared as set out in the previous examples, and five layers of 125 μm flexible polyimide aerogel (AeroZero 125 micrometer film from BlueShift Inc (US)). The laminate structure also comprised a crocheted swatch of 1.0 mm UHMWPE braided thread (see FIG. 9 and accompanying description) with UHMWPE thread whipping around the tile edges to improve performance. The test results showed no penetration in a stab test and only a minimal dent in a plasticine clay-bed, which is significantly better than commercially available standards.

Example 10

A composite structure having the structure set out in Table 1, below, was prepared. The composite structure, in order of layers from uppermost (Active/Strike face) to lowermost (Back face), was:

TABLE 1

| Composite structure of Example 10 |
| --- |
| Stab-proof UHMWPE |
| 7 stacks × 16 layers of UHMWPE |
| 1 stack × 18 periods of graphene/polyurethane layers alternating with aerogel layers |
| 1 stack × 16 layers of UHMWPE |
| 1 stack × 8 periods of graphene/polyurethane layers alternating with aerogel layers |
| 1 stack × 4 layers of UHMWPE |
| Stab-proof UHMWPE |

The stab-proof casing is a woven UHMWPE cover at a weight of 660 gsm.

The UHMWPE stacks used in Example 10 are made from a single DOYENTRONTEX Bulletproof unidirectional sheet; WB-674M; 160 g/m$^2$, which is folded to provide the stack of 16 ballistic layers. Thus, the 7 stacks of 16 ballistic layers were formed from 7 different sheets of UHMWPE ballistic material, each of which was folded in a 4×4 configuration. The stack of 4 ballistic layers was also prepared from a single, smaller sheet of UHMWPE ballistic material (folded in a 1×4 configuration) that was sized so that each ballistic layer had the same dimensions as the layers of the larger stacks. Each stack thus provides a protective structure comprising connecting ballistic layers. The face size (and therefore the size of each layer) was approximately 400 mm×300 mm.

The backing structure was comprised of 18 periods of graphene/polyurethane layers alternating with aerogel layers. Specifically, each period had a polyurethane layer that was doped with graphene and applied on top of an aerogel layer. This structure was repeated 18 times for the upper ancillary structure and 8 times for the lower structure, to therefore provide each with a repeating structure: . . . Graphene+PU/Aerogel/Graphene+PU/Aerogel . . . .

The polyurethane used was Xencast PX60 (provided as a two-part system, which is mixed together at 100:100 by weight), the Graphene was XG graphene nanoplatelets Grade M (average platelet diameter of 15 micrometres) and the Aerogel was a polyimide aerogel (AeroZero 125 micrometer film from BlueShift Inc (US)). To aid in enhancing the graphene/polyurethane interface, the graphene was functionalised with carboxyl (COOH) surface chemistry (the method used also adds some OH functionality to the surface) in a Haydale plasma reactor (using a carboxyl process).

The graphene/polyurethane layers were prepared by adding the graphene nanoplatelets to the resin component of the two-part polyurethane system in an amount of 1% by weight. This was then mixed in a centrifugal mixer (Thinky AVR-500 T) at 800 RPM for five minutes, followed by a three-roll mill for thirty minutes (5 micrometres on the front gap and 15 micrometres on the rear gap; front roll 300 rpm). The two parts of the polyurethane system were then combined and hand mixed for 5 minutes and left to allow inherent viscosity to increase. Although the time it takes the viscosity of the PX60 mixture to double (i.e. the resin component) is 11 minutes ("pot life"), the mixture was left to sit for a further ten minutes to all build-up of inherent viscosity. This stops unwanted penetration into the aerogel in a subsequent step and lowers the amount of creep following film forming.

The graphene filled polyurethane is cast onto a polypropylene sheet using a 10 micrometre K bar. This is then placed in an oven at 60° C. for 20 minutes. At this point, the aerogel (non-porous side of the aerogel) is placed onto the polyurethane and pressed down with a roller. The PP/PU+graphene/aerogel structure is returned to the oven for a further 4 hours. The aerogel/graphene+polyurethane structure is cut to size and the polypropylene layer is removed. The stack is then built up by placing the aerogel/graphene+polyurethane structures on top of one another. The graphene+polyurethane layers have a density of 1.05 g/cm$^3$ (20 g/m$^2$) and the aerogel layer has a density of 0.2 g/cm$^3$ (25 g/m$^2$).

Assembly of Example 10

The backing structures and protective layers were then arranged in the order set out in Table 1, with the stab-proof UHMWPE provided on either side of the structure. The complete structure was then placed inside a fabric pocket to provide a composite shield. Total weight was 2.72 kg (UHMWPE 2.5 kg, Aerogel layers 108 g, PU/graphene layers 116 g).

Example 11

A composite structure having the structure set out in Table 2, below, was prepared. The composite structure, in order of layers from uppermost (Active/Strike face) to lowermost (Back face), was:

TABLE 2

| Composite structure of Example 11 |
| --- |
| Stab-proof UHMWPE |
| 3 stacks × 12 layers of UHMWPE |
| 1 stack × 12 periods of |

TABLE 2-continued

| Composite structure of Example 11 |
| --- |
| graphene/polyurethane layers alternating with aerogel layers |
| 3 stacks × 12 layers of UHMWPE |
| 1 stack × 12 periods of |
| graphene/polyurethane layers alternating with aerogel layers |
| 3 stacks × 12 layers of UHMWPE |
| 1 stack × 12 periods of |
| graphene/polyurethane layers alternating with aerogel layers |
| 1 stack × 12 layers of UHMWPE |
| Stab-proof UHMWPE |

The layers and structures within this composite structure were prepared in line with those of Example 11. Total weight was 2.52 kg (UHMWPE 2.3 kg, Aerogel layers 102 g, PU/graphene layers 110 g).

Example 12

A composite structure having the structure set out in Table 3, below, was prepared. The composite structure, in order of layers from uppermost (Active/Strike face) to lowermost (Back face), was:

TABLE 3

| Composite structure of Example 12 |
| --- |
| Stab-proof UHMWPE |
| 2 stacks × 15 layers of UHMWPE |
| 1 stack × 10 periods of |
| graphene/polyurethane layers alternating with aerogel layers |
| 1 stack × 15 layers of UHMWPE |
| 1 stack × 11 periods of |
| graphene/polyurethane layers alternating with aerogel layers |
| Stab-proof UHMWPE |

The layers and structures within this composite structure were prepared in line with those of Example 10. The composite structure of this example was considerably lighter (~1 kg) compared to the weight of that of Examples 10 and 11 due to the use of less UHMWPE.

Comparative Example 1

An existing commercially available laminate structure widely used in stab-resistance worn articles was selected as a comparison for the embodiments described above. The comparative example comprises a laminate structure comprising: 12 layers of Kevlar fabric/finely stitched felt/a layer of chainmail/finely stitched felt/12 layers of Kevlar fabric. The laminate structures of Examples 1 and 2 were tested together with the comparative Example.

Comparative Example 2

It was apparent through observations and testing that a significant portion of the force of any impact in the structure of Comparative Example 1 was being dispersed in the plane of the layers by the chainmail layer and so the laminate structure of Comparative Example 1 was also tested with the chainmail removed. Thus, Comparative Example 2 consists of a laminate structure comprising 12 layers of Kevlar fabric/finely stitched felt/12 layers of Kevlar fabric.

Comparative Example 3

To test the effectiveness of the aerogel of a backing structure, the backing structures (i.e. graphene+PU and aerogel layers) were removed from the composite structure of Example 10. In particular, the stacks containing the graphene/polyurethane layers alternating with aerogel layers were removed. To keep the areal density approximately the same, these structures were replaced with 2 additional 16 sheet UHMWPE structures.

Testing
Penetration Resistance Testing

Testing was carried out using the test rig 620 shown in FIG. 7. The rig was adjusted such that the knife 640 was dropped from a height of 1 m and the total weight of the knife 640 and the weighted sled was 1.75 kg. This created a force on impact of 17.17 Joules and a velocity on impact of 4.43 m/s.

In the tests set out below, a modelling clay plate was located behind each of the samples to measure the "cut length". The cut length is the length of an indentation from a blade in the clay, which can be present even where the blade does not fully penetrate the fabric and provides an indication of the impact absorbing and penetration resistant properties of the structure.

The depth of penetration of the blade into each structure and cut lengths (where measured) are shown below in Table 4:

TABLE 4

| Sample | Jig | Depth Penetration (mm) | Cut Length (mm) |
|---|---|---|---|
| Example 3 | Jig Constrained | 2-3 | 1.1 |
| Example 4 | Jig Constrained | 2-3 | 0.9 |
| Example 5 | Jig Constrained | 2-6 | — |
| Example 8 | Jig Constrained | 6-7 | 2.7 |
| Comparative Example 1 | Free standing (no jig constraint) | 2-3 | — |
| Comparative Example 1 | Jig Constrained | 2-3 | — |
| Comparative Example 2 | Free standing (no jig constraint) | 39-41 | — |

Table 4 demonstrates that the laminate structures in accordance with an embodiment of the invention provide very high penetration resistance and perform at least as well as the laminate structures used in existing stab-proof vests which include a metal chainmail layer and significantly better than the laminate structures where the metal chainmail layer is removed. Thus, these laminate structures can be used in articles without requiring chainmail or heavy metal plate layers, thereby providing significant advantages.

The results for Example 5 also show significant protection afforded by a laminate structure with less layers and a thinner structure. The results for Example 8 show that this is more effective than existing laminate structures (Comparative Example 2).

In order to further demonstrate the ability of the laminate structures to absorb impact and prevent penetration, the test rig 620 was modified so that the knife 640 was dropped from a height of 1.25 m and the total weight of the knife 640 and the weighted sled was 1.75 kg. This created a force on impact of 21.46 Joules and a velocity on impact of 4.95 m/s. The results for Example 4 are shown below in Table 5:

TABLE 5

| Sample | Jig | Depth Penetration (mm) | Cut Length (mm) |
|---|---|---|---|
| Example 4 | Jig Constrained | 4-5 | 1.91 |

Ballistic Testing

Ballistic testing of Examples 6 and 7 was carried out. The tests involved firing a .22 Long Rifle bullet at point-blank range. Both of Examples 6 and 7 were able to stop the .22LR rifle bullet. In both cases, examination of the samples after the test showed that the bullets were stopped and held in the laminates around the 17$^{th}$ layer of UHMWPE and backing structure. Thus, the laminate structures provide effective ballistic protection.

Ballistic testing of the composite materials of Examples 10 to 12 and the structure of Comparative Example 4 was carried out. This was carried out in accordance with National Institute of Justice (NIJ) 0101.06 standard for Ballistic Resistance of Body Armour. Within this standard, there are five types of classification, as set out in Table 6, below:

TABLE 6

| NIJ 0101.06 standards classifications | |
|---|---|
| Classification | Ammunition Required |
| IIa | 9 mm Full Metal Jacketed Round Nose (FMJ RN) bullets with a specified mass of 8.0 g (124 gr) and a velocity of 373 m/s ± 9.1 m/s (1225 ft/s ± 30 ft/s) and with .40 S&W Full Metal Jacketed (FMJ) bullets with a specified mass of 11 7 g (180 gr) and a velocity of 352 m/s ± 9.1 m/s (1155 ft/s ± 30 ft/s). |
| II | 9 mm FMJ RN bullets with a specified mass of 8.0 g (124 gr) and a velocity of 398 m/s ± 9 1 m/s (1305 ft/s ± 30 ft/s) and with .357 Magnum Jacketed Soft Point (JSP) bullets with a specified mass of 10.2 g (158 gr) and a velocity of 436 m/s ± 9.1 m/s (1430 ft/s ± 30 ft/s). |
| IIIA | .357 SIG FMJ Flat Nose (FN) ballets with a specified mass of 8.1 g (125 gr) and a velocity of 448 m/s ± 9.1 m/s (1470 ft/s ± 30 ft/s) and with .44 Magnum Semi Jacketed Hollow Point (SJHP) bullets with a specified mass of 15.6 g (240 gr) and a velocity of 436 m/s ± 9.1 m/s (1430 ft/s ± 30 ft/s). |
| III (rifles) | Type III (flexible armour) 7.62 mm FMJ, steel jacketed bullets (U.S. Military designation M80) with a specified mass of 9.6 g (147 gr) and a velocity of 847 m/s ± 9.1 m/s (2780 ft/s ± 30 ft/s) |
| IV (Armour piercing rifles) | Type IV (flexible armour) .30 caliber AP bullets (U.S. Military designation M2 AP) with a specified mass of 10.8 g (165 gr) and a velocity of 878 m/s ± 9 1 m/s (2880 ft/s ± 30 ft/s). |

In Table 6, the following nomenclature is used:

Jacketed Hollow Point Bullet (JHP): A bullet consisting of a lead core that has a hollow cavity or hole located in the nose of the bullet and is completely covered, except for the hollow point, with a copper alloy (approximately 90% copper and 10% zinc) jacket. Jacketed Soft Point Bullet (JSP): A lead bullet that is completely covered, except for the nose, with a copper alloy (approximately 90% copper and 10% zinc) jacket. Also known as a Semi Jacketed Soft Point (SJSP).

Full Metal Jacketed Bullet (FMJ): A bullet consisting of a lead core completely covered, except for the base, with copper alloy (approximately 90% copper and 10% zinc). "Total Metal Jacket (TMJ)," "Totally Enclosed Metal Case (TEMC)," and other commercial terminology for bullets with electro-deposited copper and copper alloy coatings are considered comparable to FMJ bullets for this standard.

Semi Jacketed Hollow Point Bullet (SJHP): A bullet consisting of a lead core with a copper alloy (approximately 90% copper and 10% zinc) jacket covering the base and bore riding surface (major diameter), which leaves some portion of the lead core exposed, thus forming a lead nose or tip, which has a hollow cavity or hole located in the nose or tip of the bullet.

Semi Jacketed Soft Point Bullet (SJSP): A bullet, also known as a Jacketed Soft Point (JSP), consisting of a lead core with a copper alloy (approximately 90% copper and 10% zinc) jacket covering the base and bore riding surface (major diameter), which leaves some portion of the lead core exposed, thus forming a lead nose or tip.

Examples 10 and 11

Example 10 was tested at level III (above) using 7.62 Full Metal Jacket (M80 US Military designation) with a specified mass of 9.6 g (147 gr) and a velocity of 847 m/s±9.1 m/s (2780 ft/s±30 ft/s). Two M80 shots were fired against Example 10 as per the NIJ 0101.06 Level 3 standard. The composite structure of Example 10 was placed against a backing block of ballistic clay, Roma Plastilina #1 modeling clay. (ASTM Specification E3004) which had been preconditioned for 24 hours in accordance with the standard. The composite structure of Example 10 was strapped to the clay backing.

In both cases, the composite of Example 10 prevented penetration of the bullets through the structure. Back-face deformation was sufficiently small that the composite would meet the Level III criteria.

A test was also carried out for the composite structure of Example 11. In this case, a single M80 shot was carried out and the structure prevented penetration of the bullet through the structure and had acceptable back-face deformation. In this example, the back-face deformation was reduced compared to that of Example 10 indicating that the redistribution of the graphene loaded PU coating has helped dissipate more of the energy.

Figure 10:
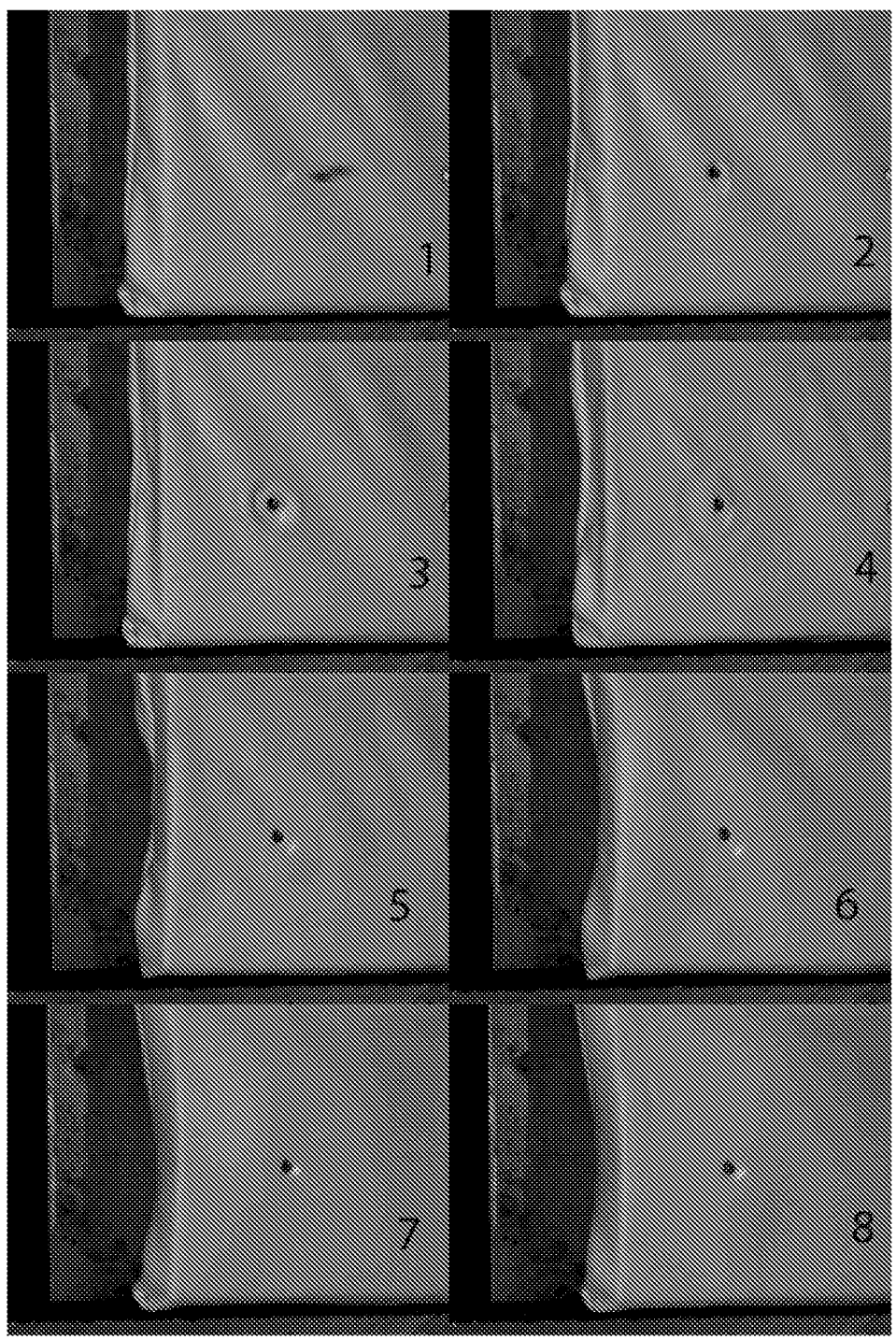
FIG. 10 shows images of a ballistic test of a composite structure according to the invention.

FIG. 10 shows a sequence of still images taken from a video sequence taken of the M80 shot on Example 2. The M80 bullet can be seen approaching in still 1 at 2800 ft·s$^{-1}$. The initial penetration of the composite material can be seen in still 2, with stills 3, 4 and 5 showing the shock wave passing across the surface of the structure. The shock wave is then disrupted by internal reflections within the shield, which serves to be a significant effect in reducing the force (i.e. force dissipation). Interference from reflected wave fronts stops the wave being easily seen in the rest of the still images.

Comparative Example 4

Comparative Example 4 was tested in the same way as Example 10. Two 7.62 Full Metal Jacket (M80 US Military designation) with a specified mass of 9.6 g (147 gr) and a velocity of 847 m/s±9.1 m/s (2780 ft/s±30 ft/s) were fired at the structure. The two M80 bullets were fired at 2773 and 2775 ft·s$^{-1}$ respectively. Comparing the imaging from the testing with Examples 10 and 11, there was less of a shockwave observed in the composite structure, and very little rebound wave fronts. The clay back plate and the back face of the structure after the second M80 shot was fired showed considerable damage to the clay behind (completely blown through) and there are distinct bullet exit holes in the back of the structure. This composite structure accordingly failed to prevent passage of the bullets.

Example 12—Testing after Submerging with Water

Testing of the composite material Example 12 was initially carried out under NIJ 0101.06 Level IIIa testing, which it passed. The composite material was then completely submerged (weighed down) for 1 hour in tap water at ambient temperature. The composite was then re-tested under the same NIJ 0101.06 Level IIIa testing protocols. Two bullets were fired at it, one 9 mm full metal jacket roundnose and one .44 Magnum Semi Jacketed Hollow Point bullet.

The water-soaked composite material behaved in a similar fashion to the dry composite. In terms of the 9 mm bullet, shock waves were seen passing across the structure, and with the .44 bullet, significant flexing was observed with a fair bullet strike near the edge of the structure.

The most significant differences were seen with the back-face deformation. With both the 9 mm and .44 magnum bullets on a dry structure, some back-face deformation was evident (2-5 mm). However, with the water-logged structures, the 9 mm bullet showed no back-face deformation and the 0.44 magnum bullet showed an impression of the stab-proof outer fabric in the clay but no discernible back-face deformation.

Accordingly, in terms of loss in performance following submergence in water that has been reported with some Kevlar based armours, the composite structures according to the present invention actually improve performance when water-logged. The aerogel has a reported water ingress of only 2% by weight, so it is thought that the water must be spatially positioning between the packs of UHMWPE and aerogel composite and must be assisting in the transference of energy across the structure as well as releasing some energy as the water is forced out of the structure on impact.

Although the invention has been described with reference to specific embodiments and examples above, it will be appreciated that modifications can be made to the embodiments and examples without departing from the invention. For example, in the above embodiments, the protective layer and layers of the backing structure have been shown as adjacent layers; however, additional layers or components may be provided between these.

Similarly, although specific impacts from an object or projectile (e.g. a bullet or a knife) are discussed, it will be appreciated that laminate structures falling within the scope of the invention have application in other environments. For example, the laminate structures and articles can be used in safety gear or protective clothing (e.g. as motorbike protective wear or worksite protective clothing.

The invention claimed is:

1. A laminate structure, comprising:
a plurality of protective layers arranged as a stack, wherein a part of each protective layer is moveable relative to at least one other protective layer in the stack and wherein a part of each protective layer is connected to at least one other protective layer in the stack so as to restrict relative movement of a part of each of the protective layers; and
a backing structure comprising a first support layer comprising an aerogel and a second support layer comprising a polymer, wherein the backing structure is arranged so that the second support layer is provided between the plurality of protective layers and the first support layer,
wherein the second support layer further comprises graphene; and
wherein the plurality of the protective layers in the stack are formed from a single sheet of high-tensile material folded to form the plurality of protective layers, the folds providing the connection between the protective layers in the stack.

2. The laminate structure of claim 1, further comprising at least one additional backing structure comprising a first support layer comprising an aerogel and a second support layer comprising a polymer, such that the laminate structure comprises a plurality of backing structures.

3. The laminate structure of claim 2, wherein the backing structures are arranged so that the first support layers and second support layers in the laminate structure alternate.

4. The laminate structure of claim 3, wherein the laminate structure further comprises at least one additional protective layer provided between each of the backing structures.

5. The laminate structure of claim 4, wherein each additional protective layer is provided on the corresponding second support layer of each of the backing structures.

6. The laminate structure of claim 1, wherein the plurality of protective layers comprise a high-tensile layer.

7. The laminate structure of claim 1, wherein the plurality of protective layers comprise a polymer and/or carbon-based material.

8. The laminate structure of claim 7, wherein the plurality of protective layers comprise the high-tensile material selected from the group consisting of aramid fibres, aromatic polyamide fibres, boron fibres, ultra-high molecular weight polyethylene, poly(p-phenylene-2,6-benzobisoxazole) (PBO), poly{2,6-diimidazo[4,5-b:4',5'-e]-pyridinylene-1,4 (2,5-dihydroxy)phenylene} (PIPD) and combinations thereof.

9. The laminate structure of claim 1,
wherein the second support layer in the backing structure is disposed on the corresponding first support layer in the backing structure; and/or
wherein the second support layer extends around the first support layer so as to surround the aerogel.

10. The laminate structure of claim 1, wherein the aerogel is a polyimide aerogel.

11. The laminate structure of claim 1,
wherein the first support layer has a thickness of 50 μm to 500 μm; and/or
wherein the second support layer has a thickness of 5 μm to 50 μm.

12. The laminate structure of claim 1, further comprising a fastening element arranged to secure the plurality of protective layers to the backing structure, the fastening element being provided along an edge of the laminate structure.

13. The laminate structure of claim 1, wherein the plurality of protective layers comprises a weaved arrangement of wound fibres.

14. The laminate structure of claim 1, wherein each protective layer of the stack is connected to at least one adjacent protective layer at or adjacent an edge of each protective layer, optionally wherein each protective layer is connected to at least one adjacent protective layer at or adjacent the edges of the protective layer so as to constrain movement of a part of protective layer around the perimeter of each protective layer.

15. The laminate structure of claim 1,
wherein the polymer of the second support layer is an elastomer; or
wherein the polymer of the second support layer is selected from at least one of polyurethane, polyethylene, polypropylene, polyester, polyamide, polyimide and/or an epoxy resin.

16. The laminate structure of claim 1,
wherein the polymer of the second support layer is an elastomer; and
wherein the polymer of the second support layer is selected from at least one of polyurethane, polyethylene, polypropylene, polyester, polyamide, polyimide and/or an epoxy resin.

* * * * *